US011880738B1

(12) United States Patent
Bloch et al.

(10) Patent No.: US 11,880,738 B1
(45) Date of Patent: Jan. 23, 2024

(54) VISUAL ODOMETRY FOR OPTICAL PATTERN SCANNING IN A REAL SCENE

(71) Applicant: SCANDIT AG, Zurich (CH)

(72) Inventors: Matthias Bloch, Zurich (CH); Ugur Kart, Tampere (FI)

(73) Assignee: Scandit AG, Zurich (CH)

( * ) Notice: Subject to any disclaimer, the term of this patent is extended or adjusted under 35 U.S.C. 154(b) by 0 days.

(21) Appl. No.: 17/890,087

(22) Filed: Aug. 17, 2022

Related U.S. Application Data

(60) Provisional application No. 63/311,629, filed on Feb. 18, 2022, provisional application No. 63/233,947, filed on Aug. 17, 2021.

(51) Int. Cl.
| | | |
|---|---|---|
| *G06K 7/14* | (2006.01) | |
| *G06T 7/194* | (2017.01) | |
| *G06T 7/70* | (2017.01) | |
| *G06V 10/44* | (2022.01) | |
| *G06T 7/20* | (2017.01) | |

(52) U.S. Cl.
CPC ............ *G06K 7/1413* (2013.01); *G06T 7/194* (2017.01); *G06T 7/20* (2013.01); *G06T 7/70* (2017.01); *G06V 10/44* (2022.01); *G06V 2201/07* (2022.01)

(58) Field of Classification Search
CPC ...... G06K 7/1408; G06K 7/1443; G06T 7/70; G06T 7/20; G05D 1/0253
USPC ................................ 235/462.01, 454, 462.45
See application file for complete search history.

(56) References Cited

U.S. PATENT DOCUMENTS

| | | |
|---|---|---|
| 4,167,756 A | 9/1979 | Smith |
| D344,261 S | 2/1994 | Watanabe |
| 5,744,815 A | 4/1998 | Gurevich et al. |
| D473,872 S | 4/2003 | Ausems et al. |
| 6,580,453 B1 | 6/2003 | Hirasawa |
| D576,197 S | 9/2008 | Takagi |
| 7,457,407 B2 | 11/2008 | Sun et al. |
| D654,931 S | 2/2012 | Lemelman et al. |

(Continued)

FOREIGN PATENT DOCUMENTS

| | | |
|---|---|---|
| EP | 3167404 A1 | 5/2017 |
| JP | 2004032507 A | 1/2004 |

(Continued)

OTHER PUBLICATIONS

International Application No. PCT/US2021/025212 received an International Search Report and the Written Opinion dated Aug. 12, 2001, 11 pages.

(Continued)

*Primary Examiner* — Paultep Savusdiphol

(74) *Attorney, Agent, or Firm* — Kilpatrick Townsend & Stockton LLP

(57) ABSTRACT

Visual odometry is used for tracking an optical pattern outside a preview area of a camera. The optical pattern is detected in a first image, while the camera is at a first position. A second image is acquired while the camera is at a second position. A transformation is calculated that relates the first position to the second position. A location of the optical pattern in relation to the second image is calculated based on the transformation. Calculation of the transformation can be simplified by assuming that the camera is moved in a plane parallel to a plane having multiple optical patterns.

20 Claims, 13 Drawing Sheets

(56) References Cited

U.S. PATENT DOCUMENTS

| | | | |
|---|---|---|---|
| D658,174 S | 4/2012 | Tasselli et al. |
| D659,564 S | 5/2012 | Baxter |
| 8,223,203 B2 | 7/2012 | Ohsumi et al. |
| D667,823 S | 9/2012 | Merenda |
| D670,278 S | 11/2012 | Hamann |
| D672,386 S | 12/2012 | Matunuma et al. |
| D678,870 S | 3/2013 | Fathollahi |
| D678,936 S | 3/2013 | Oliver |
| D685,360 S | 7/2013 | Chen et al. |
| D688,654 S | 8/2013 | Stevinson |
| 8,596,540 B2 | 12/2013 | Adelmann |
| D698,772 S | 2/2014 | Merenda |
| D710,343 S | 8/2014 | Chandler, Jr. et al. |
| D710,346 S | 8/2014 | Smith et al. |
| 8,798,453 B2 | 8/2014 | Lawton |
| D716,285 S | 10/2014 | Chaney et al. |
| D716,785 S | 11/2014 | White |
| D717,287 S | 11/2014 | Macrina et al. |
| D717,304 S | 11/2014 | Yturralde et al. |
| D719,166 S | 12/2014 | Brown et al. |
| D719,167 S | 12/2014 | Brown et al. |
| D724,573 S | 3/2015 | Stevinson |
| D726,701 S | 4/2015 | Stevinson |
| 9,019,420 B2 | 4/2015 | Hurst et al. |
| D728,551 S | 5/2015 | Saeki et al. |
| D732,011 S | 6/2015 | Stevinson |
| D733,112 S | 6/2015 | Chaney et al. |
| D734,336 S | 7/2015 | Mistkawi et al. |
| D744,470 S | 12/2015 | Stevinson |
| D748,085 S | 1/2016 | Merenda |
| D754,114 S | 4/2016 | Curtis et al. |
| D754,650 S | 4/2016 | Curtis et al. |
| D759,004 S | 6/2016 | Stevinson |
| D760,209 S | 6/2016 | Weng et al. |
| D760,212 S | 6/2016 | Mao et al. |
| D760,710 S | 7/2016 | Ozolins et al. |
| D761,240 S | 7/2016 | Ozolins et al. |
| D768,617 S | 10/2016 | Merenda |
| D771,631 S | 11/2016 | Fitch et al. |
| 9,654,675 B2 | 5/2017 | Kessler |
| 9,659,204 B2 | 5/2017 | Wu et al. |
| 9,836,635 B2 | 12/2017 | Negro et al. |
| 10,013,643 B2 | 7/2018 | Yellapragada et al. |
| 10,025,886 B1 * | 7/2018 | Rublee ................ G01B 11/254 |
| 10,191,242 B2 | 1/2019 | Palmeri |
| 10,229,301 B2 | 3/2019 | Cumoli et al. |
| 10,200,599 B1 | 5/2019 | Baldwin |
| D860,180 S | 9/2019 | Lehmann et al. |
| D862,441 S | 10/2019 | Eppler et al. |
| 10,426,442 B1 | 10/2019 | Schnorr |
| 10,452,959 B1 | 10/2019 | Gautam et al. |
| 10,558,844 B2 | 2/2020 | D'ercoli et al. |
| 10,621,435 B2 | 4/2020 | Bridges et al. |
| 10,818,014 B2 | 10/2020 | Xu et al. |
| 10,846,561 B1 | 11/2020 | Floerkemeier et al. |
| 10,963,658 B1 | 3/2021 | Bloch et al. |
| 11,087,105 B1 | 8/2021 | Biasini et al. |
| 11,216,628 B2 | 1/2022 | Scherly et al. |
| 11,244,147 B2 | 2/2022 | Floerkemeier et al. |
| 11,290,643 B1 | 3/2022 | Tullis et al. |
| 11,295,163 B1 | 4/2022 | Schoner et al. |
| 11,417,001 B1 | 8/2022 | Bloch et al. |
| 2003/0059124 A1 | 3/2003 | Center, Jr. |
| 2003/0202697 A1 | 10/2003 | Simard et al. |
| 2004/0221790 A1 * | 11/2004 | Sinclair .................. G06T 7/20 356/4.03 |
| 2006/0011724 A1 | 1/2006 | Joseph et al. |
| 2006/0075241 A1 | 4/2006 | Deguillaume et al. |
| 2006/0249581 A1 | 11/2006 | Smith |
| 2007/0116454 A1 | 5/2007 | Tsai |
| 2009/0002797 A1 | 1/2009 | Kwong et al. |
| 2009/0033786 A1 | 2/2009 | Finkelstein et al. |
| 2009/0108071 A1 | 4/2009 | Carlson |
| 2009/0212113 A1 | 8/2009 | Chiu et al. |
| 2009/0304234 A1 | 12/2009 | Kondo et al. |
| 2010/0102129 A1 | 4/2010 | Drzymala et al. |
| 2010/0328420 A1 | 12/2010 | Roman |
| 2011/0007205 A1 | 1/2011 | Lee |
| 2011/0043683 A1 | 2/2011 | Beach et al. |
| 2011/0081946 A1 | 4/2011 | Singh |
| 2011/0168776 A1 | 7/2011 | Jalali et al. |
| 2013/0076697 A1 | 3/2013 | Goertz et al. |
| 2013/0112750 A1 | 5/2013 | Negro et al. |
| 2013/0206839 A1 | 8/2013 | Gao |
| 2013/0329115 A1 | 12/2013 | Palmeri |
| 2014/0025973 A1 | 1/2014 | Schillings et al. |
| 2014/0027503 A1 | 1/2014 | Kennedy et al. |
| 2014/0168468 A1 | 6/2014 | Levoy et al. |
| 2014/0171150 A1 | 6/2014 | Hurst et al. |
| 2014/0232930 A1 | 8/2014 | Anderson |
| 2014/0247278 A1 | 9/2014 | Samara et al. |
| 2014/0285913 A1 | 9/2014 | Palmeri |
| 2014/0327815 A1 | 11/2014 | Auger |
| 2015/0048167 A1 | 2/2015 | Russell et al. |
| 2015/0053765 A1 | 2/2015 | Powell et al. |
| 2015/0116547 A1 | 4/2015 | Laroia |
| 2015/0220766 A1 | 8/2015 | Russell et al. |
| 2016/0042315 A1 | 2/2016 | Field-Darragh et al. |
| 2016/0062359 A1 * | 3/2016 | Liao .................. G05D 1/0253 701/28 |
| 2016/0068114 A1 * | 3/2016 | Liao .................... G06T 7/73 348/148 |
| 2016/0070944 A1 | 3/2016 | McCloskey et al. |
| 2016/0077307 A1 | 3/2016 | Palmeri |
| 2016/0080897 A1 * | 3/2016 | Moore ................ G06V 20/10 340/539.13 |
| 2016/0104021 A1 * | 4/2016 | Negro ................ G06K 7/1417 235/462.08 |
| 2016/0171707 A1 | 6/2016 | Schwartz |
| 2016/0188941 A1 | 6/2016 | Todeschini et al. |
| 2016/0253599 A1 | 9/2016 | Lang et al. |
| 2016/0307006 A1 | 10/2016 | Wang |
| 2016/0321819 A1 | 11/2016 | Morgan-Mar et al. |
| 2016/0323508 A1 | 11/2016 | Ayalasomayajula et al. |
| 2016/0339576 A1 * | 11/2016 | Rublee ................ B25J 13/089 |
| 2017/0013179 A1 | 1/2017 | Kang et al. |
| 2017/0032311 A1 | 2/2017 | Rizzolo et al. |
| 2017/0041540 A1 | 2/2017 | Foster et al. |
| 2017/0243097 A1 | 8/2017 | Loy et al. |
| 2017/0286901 A1 * | 10/2017 | Skaff ................ G06V 20/10 |
| 2017/0315558 A1 * | 11/2017 | Vojak ................ G01S 5/16 |
| 2018/0081417 A1 | 3/2018 | Chan et al. |
| 2018/0101813 A1 * | 4/2018 | Paat ................ G06Q 10/087 |
| 2018/0122194 A1 | 5/2018 | Schoner |
| 2018/0137319 A1 | 5/2018 | Giordano et al. |
| 2018/0139337 A1 | 5/2018 | Ghazizadeh |
| 2018/0157885 A1 | 6/2018 | Gurzumar |
| 2018/0314908 A1 | 11/2018 | Lam |
| 2018/0342050 A1 | 11/2018 | Fitzgerald et al. |
| 2019/0065803 A1 | 2/2019 | Burke et al. |
| 2019/0180150 A1 * | 6/2019 | Taylor ................ G06V 30/224 |
| 2019/0188435 A1 | 6/2019 | Davis et al. |
| 2019/0213523 A1 | 7/2019 | Adato et al. |
| 2019/0244043 A1 | 8/2019 | Bradley et al. |
| 2019/0304132 A1 | 10/2019 | Yoda et al. |
| 2019/0325183 A1 | 10/2019 | Tscherepanow et al. |
| 2019/0354923 A1 | 11/2019 | Taira et al. |
| 2020/0042803 A1 | 2/2020 | Yamaguchi |
| 2020/0084375 A1 | 3/2020 | Tadano et al. |
| 2020/0130864 A1 * | 4/2020 | Brockers ................ B64D 47/08 |
| 2021/0043005 A1 * | 2/2021 | Arora .................... G06F 40/166 |
| 2021/0125141 A1 | 4/2021 | Lipsey et al. |
| 2021/0150618 A1 | 5/2021 | Glaser et al. |
| 2021/0158278 A1 | 5/2021 | Bogolea et al. |
| 2021/0192162 A1 | 6/2021 | Rodriguez et al. |
| 2021/0375054 A1 * | 12/2021 | Pan ............................ G06T 7/75 |
| 2022/0324112 A1 * | 10/2022 | Wolowelsky ........ G05D 1/0274 |

FOREIGN PATENT DOCUMENTS

| | | |
|---|---|---|
| JP | 2019094191 | 6/2019 |
| KR | 20020077090 A | 10/2002 |
| KR | 20060102957 A | 9/2006 |

(56) References Cited

FOREIGN PATENT DOCUMENTS

| WO | 0131893 | A1 | 5/2001 |
|---|---|---|---|
| WO | 2016007662 | A1 | 1/2016 |
| WO | 2019135163 | A2 | 7/2019 |

OTHER PUBLICATIONS

Invitation to Pay Additional Fees and, Where Applicable, Protest Fee, dated Jun. 17, 2021 in International Patent Application No. PCT/US2021/025212, 2 pages.

"Code Reader 4405 User Manual", Code Product Line Version 03, Release date: Jan. 2016,. Code Corporation, Accessed on: Dec. 22, 2020 [Online]. Retrieved from: https://web.archive.org/web/20181223184651/http://www.codecorp.com/products.php?id=167, 16 pages.

"Flens—The First Flashlight Booster for Smartphones", created by Basilico, Kickstarter, last updated Dec. 11, 2019, Accessed on Mar. 26, 2021 from https://kickstarter.com/projects/basilico/flen-the-first-flashlight-booster-for-smartphones, 26 pages.

"Linea Pro Extreme Rugged Case". Infinite Peripherals, iOS Accessories, Linea Pro and Infinea Tab Accessories, Retrieved on Dec. 22, 2020 from https://web.archive.org/web/20150825044354/http://ipcprint.com/linea-pro-extreme-rugged-case.html 3 page.

Brownlee; Jason, "Deep Learning Models for Human Activity Recognition", Deep Learning for Time Series, Navigation, last updated Aug. 5, 2019, 16 pages.

Scandit, "Scandit Augmented Reality Retail Price Label Verification", posted Sep. 26, 2018, retrieved on Aug. 4, 2020 from https://www.scandit.com/resources/videos/scandit-augmented-reality-retail-price-label-verification/ , 5 pages.

Scandit, "Scandit Augmented Reality for Smart Devices", posted Oct. 2, 2019, retrieved on Dec. 2, 2020 from https://www.scandit.com/resources/videos/scandit-augmented-reality-for-smart-devices/, 3 pages.

Scandit, "Scandit Augmented Retail Product Information Using AR", posted Sep. 26, 2018, retrieved on Dec. 2, 2020 from https://www.scandit.com/resources/videos/scandit-augmented-retail-product-information-using-ar/, 5 pages.

Scandit, "Scandit Augmented Reality Retail Click and Collect", posted Sep. 26, 2018, retrieved on Dec. 2, 2020 from https://www.scandit.com/resources/videos/scandit-augmented-reality-retail-click-and-collect/, 4 pages.

Scandit, "Scandit Augmented Reality Retail Shelf Management", posted Sep. 26, 2018, retrieved on Dec. 2, 2020 from https://www.scandit.com/resources/videos/scandit-augmented-reality-retail-shelf-management/, 4 pages.

Scandit, "Computer Vision and Augmented Reality for Enterprise Applications", posted Jun. 6, 2018, retrieved on Dec. 2, 2020 from https://www.scandit.com/resources/videos/computer-vision-and-augmented-reality-for-enterprise-applications/, 2 pages.

U.S. Appl. No. 17/396,123 received a Non-Final Office Action, dated Dec. 2, 2021, 6 pages.

U.S. Appl. No. 17/468,376 received a Notice of Allowance, dated Nov. 29, 2021, 14 pages.

U.S. Appl. No. 17/549,805, Non-Final Office Action, dated Mar. 2, 2022, 10 pages.

U.S. Appl. No. 17/549,805, Notice of Allowance, dated Sep. 29, 2022, 9 pages.

U.S. Appl. No. 16/920,061 received a Pre-Interview First Office Action dated Sep. 16, 2020, 6 pages.

U.S. Appl. No. 16/920,061 received a Notice of Allowance dated Dec. 2, 2020, 10 pages.

U.S. Appl. No. 17/396,123 received a Non-Final Office Action, dated Dec. 2, 2021, all pages.

U.S. Appl. No. 17/468,376 received a Notice of Allowance, dated Nov. 29, 2021, all pages.

U.S. Appl. No. 17/549,805, Non-Final Office Action, dated Mar. 2, 2022, all pages.

U.S. Appl. No. 17/549,805, Notice of Allowance, dated Jun. 29, 2022, all pages.

U.S. Appl. No. 17/244,251, Notice of Allowance, dated Jul. 27, 2022, all pages.

U.S. Appl. No. 17/016,896, Notice of Allowance, dated Nov. 16, 2022, all pages.

U.S. Appl. No. 17/565,131, Notice of Allowance, dated Dec. 8, 2022, all pages.

* cited by examiner

VISUAL ODOMETRY FOR OPTICAL PATTERN SCANNING IN A REAL SCENE

CROSS REFERENCE TO RELATED APPLICATIONS

This application claims priority to U.S. Provisional Patent Appl. No. 63/233,947, filed on Aug. 17, 2021, and U.S. Provisional Patent Appl. No. 63/311,629, filed on Feb. 18, 2022, each of which are incorporated by reference for all purposes.

BACKGROUND

This disclosure relates in general to a camera in a mobile device. More specifically, and without limitation, this disclosure relates to decoding barcodes in a scene or image using the camera in the mobile device. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using as smartphone to decode a barcode is provided in U.S. Pat. No. 8,596,540, granted on Dec. 3, 2013.

BRIEF SUMMARY

Mobile devices having a camera, and being capable of hosting mobile applications, offer a flexible and scalable solution for optical pattern decoding. However, scanning many optical patterns quickly and efficiently can be challenging. There is a need for improved optical-pattern scanning using a camera in a mobile device that can more quickly and/or efficiently scan many optical patterns.

In certain embodiments, a method for a workflow for detecting multiple optical patterns in a scene comprises: detecting motion of a mobile device; ascertaining that the mobile device does not exceed a movement threshold value; acquiring a first set of images using a camera of the mobile device; scanning the first set of images for barcodes; detecting and decoding; a first set of barcodes in the first set of images; tracking the first set of barcodes; presenting on the mobile device an indication of barcodes decoded; detecting motion of the mobile device; stopping to scan for barcodes; ascertaining that the mobile device does not exceed the threshold value for movement, after detection motion of the mobile device; acquiring a second set of images using a camera of the mobile device; detecting and decoding a second set of barcodes in the second set of images; tracking the second set of barcodes; and/or presenting on the mobile device an indication of the second set of barcodes decoded.

In certain embodiments, an apparatus for using visual odometry during optical pattern scanning comprises a camera and one or more memory devices comprising. The one or more memory devices comprise instructions that, when executed, cause one or more processors to perform the following steps: receiving a first image of a scene acquired by a camera, wherein the first image is acquired by the camera while the camera is at a first position; identifying an optical pattern in the first image; identifying a set of features in the first image in relation to the optical pattern; receiving a second image of the scene acquired by the camera, wherein the second image is acquired by the camera while the camera is at a second position; identifying the set of features in the second image; calculating a transformation that relates the first position of the camera to the second position of the camera, based on the set of features identified in the first image and the second image; and/or calculating a location of the optical pattern in relation to the second image, based on the transformation and the set of features in relation to the optical pattern. In some embodiments, the camera is part of a hand-held, mobile device; the one or more memory devices are part of the hand-held, mobile device; calculating the transformation assumes that the camera moves in a plane parallel with the scene; the location of the optical pattern in relation to the second image is measured in pixels of the camera; and/or the transformation is calculated without using intrinsic data about the camera.

In certain embodiments, a method for using visual odometry during optical pattern scanning comprises receiving a first image of a scene acquired by a camera, wherein the first image is acquired by the camera while the camera is at a first position; identifying an optical pattern in the first image; identifying a set of features in the first image in relation to the optical pattern; receiving a second image of the scene acquired by the camera, wherein the second image is acquired by the camera while the camera is at a second position; identifying the set of features in the second image; calculating a transformation that relates the first position of the camera to the second position of the camera, based on the set of features identified in the first image and the second image; and/or calculating a location of the optical pattern in relation to the second image, based on the transformation and the set of features in relation to the optical pattern. In some embodiments, calculating the transformation assumes the camera moves in only one dimension; the optical pattern is not fully in the second image; the set of features is estimated to be on a plane while calculating the transformation; calculating the transformation assumes that the camera moves in a plane parallel with the scene; the location of the optical pattern in relation to the second image is measured in pixels of the camera; the set of features is a first set of features; the transformation is a first transformation; the transformation assumes no tilt of the camera with respect to the scene; and/or the optical pattern is a first optical pattern. In some embodiments, the method further comprises receiving a third image acquired by the camera, wherein the third image is acquired by the camera while the camera is at a third position; calculating a second transformation that relates the second position of the camera to the third position of the camera, based on a second set of features identified in both the second image and the third image; calculating a location of the optical pattern in relation to the third image, based on the second transformation; segmenting the second image into foreground and background segments, before identifying the set of features in the second image; identifying the set of features in the foreground segment of the second image; receiving a plurality of images acquired by the camera, wherein the camera acquires the plurality of images while the camera is at the first position, and each of the plurality of images is acquired using a different focal distance setting of the camera; identifying a second optical pattern in one of the plurality of images; calculating a location of the second optical pattern in relation to the second image, based on the transformation; segmenting the second image into foreground and background segments, before identifying the set of features in the second image; and/or identifying the set of features in the foreground segment of the second image.

In certain embodiments, a method for automatic detection of a missing barcode comprises receiving a set of images; measuring distances between a plurality of barcodes in the set of images; identifying a periodic pattern of barcode locations based on measuring distances between the plurality of barcodes; identifying a location of a missing barcode, based on the periodic pattern; and/or indicating to the user an estimated location of the missing barcode.

In certain embodiments, a method for counting non-serialized optical patterns comprises receiving one or more images comprising a plurality of barcodes, wherein two or more of the plurality of barcodes are non-distinguishable from each other; mapping the plurality of barcodes; counting the plurality of barcodes using the map; and/or decoding the plurality of barcodes.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as barcodes and QR codes, are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. The following techniques can be used individually, in combination with each other, and/or in combination with other techniques.

Figure 1:
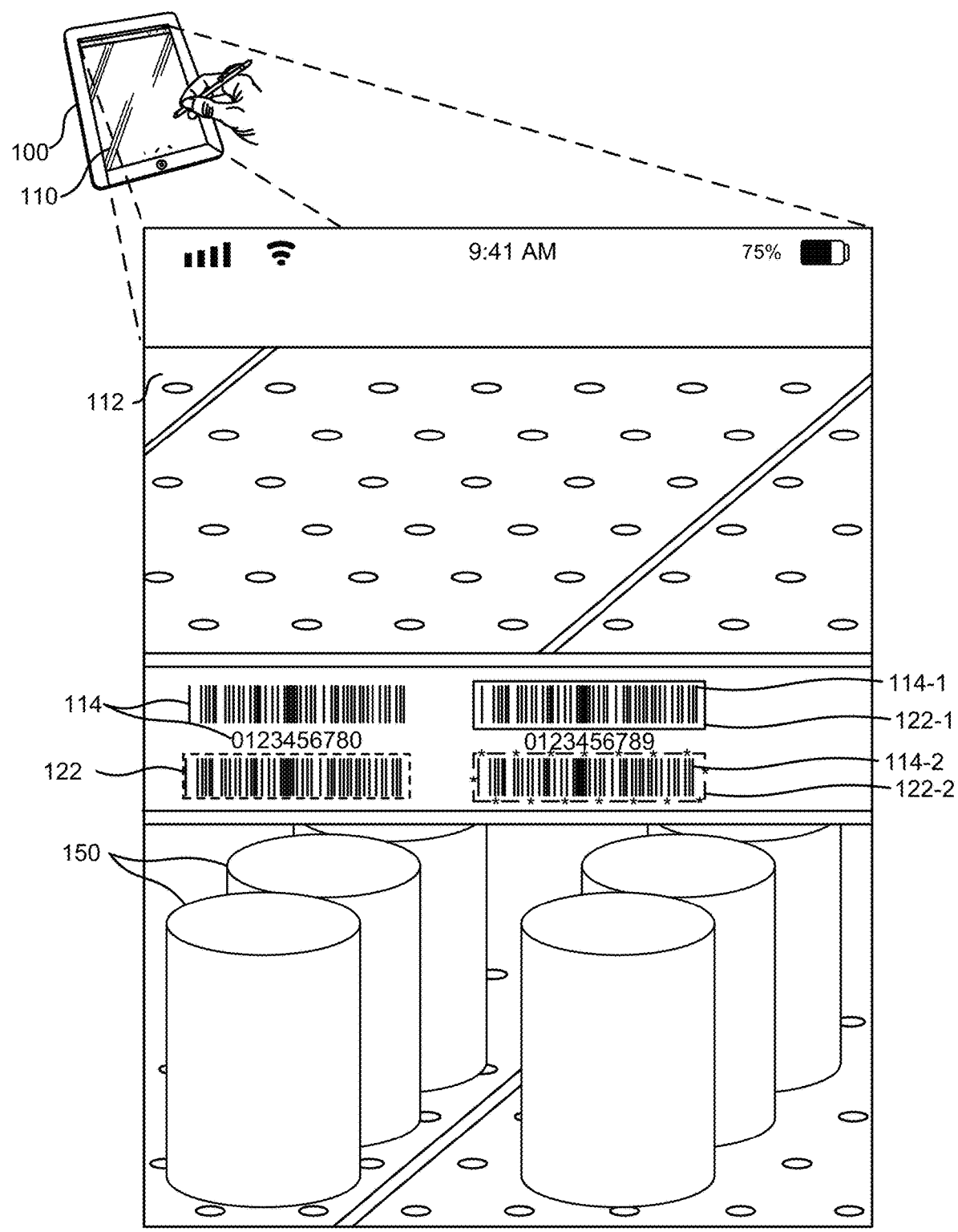
FIG. 1 depicts an example technique for automated recognition and decoding of a pattern in an image containing multiple patterns, in accordance with some embodiments.

FIG. 1 depicts an example technique for automated detection and decoding of one or more optical patterns in an image, in accordance with some embodiments. In FIG. 1, a system 100 (e.g., a mobile device) comprises a display 110 and a camera. The camera has a field of view (FOV) of a real scene. The camera is configured to capture an image 112 of the real scene. The real scene contains one or more optical patterns 114.

The camera can capture a plurality of images. The plurality of images can be presented in "real time" on the display 110 (e.g., presented on the display 110 in a sequential manner following capture, albeit potentially with some latency introduced by system processes). The image 112 is one of the plurality of images. The plurality of images depict the real world scene as viewed through the field of view of the camera. The real world scene may include multiple objects 150, patterns, or other elements (e.g., faces, images, colors, etc.) of which the optical patterns 114 are only a part. FIG. 1 depicts a first optical pattern 114-1 and a second optical pattern 114-2, among other optical patterns 114.

The image 112 may be captured by the camera and/or provided via additional or alternative system processes (e.g., from a memory device, a communications connection to an online content network, etc.). The optical patterns 114 are detected and/or recognized in the image 112. Detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type), specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, an approach can be used to detect a pattern of characters, and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that a user is presented the positions of the optical patterns 114 as well as other metadata, including but not limited to pattern category, decoding status, or information encoded by the optical patterns 114.

The system 100 may identify one or more of the optical patterns 114 for decoding. As mentioned above, the decoding may be automated, initializing upon detection of an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about an optical pattern template category or the number of patterns detected. Following decoding, the first graphical element 122-1 may present information specific to the first optical pattern 114-1. For an optical pattern 114 that is detected, but decoding is unsuccessful, the system 100 may alter a graphical element 122 to indicate decoding failure, as well as other information indicative of a source of the error. As an illustrative example, a second graphical element 122-2 may indicate that the second optical pattern 144-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded or is changed to a green box if the second optical pattern 114-2 is decoded. Examples of graphical elements used during detecting and decoding optical patterns can be found in U.S. application Ser. No. 16/905,722, filed on Jun. 18, 2020, which is incorporated by reference for all purposes. Optical patterns can also be tracked, as described in U.S. patent application Ser. No. 16/920,061, filed on Jul. 2, 2020, which is incorporated by reference for all purposes.

A. Optical Pattern Mapping Workflow

In some embodiments, a system is configured to scan multiple barcodes in a scene. A user is guided towards a good operating point. Motion of a mobile device (e.g., a phone, such as a smartphone, or a tablet) is analyzed. While the mobile device is held still, a scanning process is started. Optical patterns (e.g., barcodes) are detected and/or decoded in one or multiple frames during the scanning process. After the algorithm is confident that the section of the scene has been analyzed, results are presented (e.g., on a screen of the mobile device) to the user. Results can include successfully decoded barcodes (e.g., with a green overlay) and/or locations that the algorithm suspects to contain a barcode but the barcode could not be decoded (e.g., with a red overlay). The mobile device is moved to a next section of the scene to be scanned. While the mobile device is moved, already analyzed part(s) of the scene are augmented with an overlay which allows the user to position the mobile device more efficiently. For example, the mobile device can be moved so that scanned sections to not overlap. After the mobile device is held still, the scanning process is started again, and new codes are detected and/or decoded.

Figure 2:
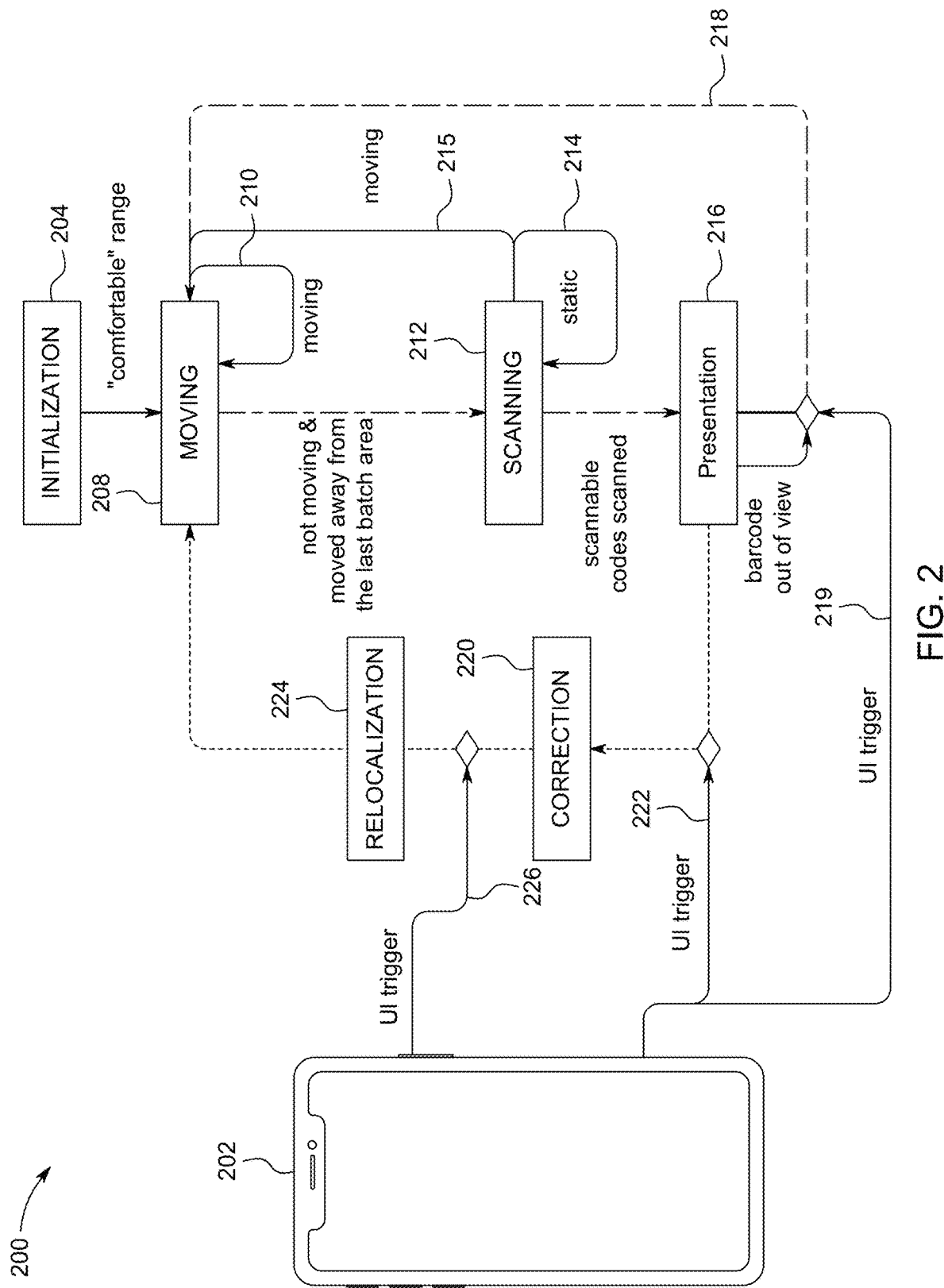
FIG. 2 illustrates a diagram of an embodiment of a workflow of detecting multiple optical patterns in a scene.

In FIG. 2 illustrates a diagram of an embodiment of a workflow 200 of detecting multiple optical patterns in a scene. The workflow 200 is executed on a mobile device 202.

Initialization

Workflow 200 begins in step 204, initialization. During initialization, the user brings the mobile device to an operating distance. A proper operating distance that can accurately scan some codes is better than a greater distance having more codes within a field of view (e.g., to maximize a number of codes within a scene) that cannot be as accurately scanned. In some embodiments, the operating distance is equal to or greater than 30 cm and/or equal to or less than 60, 90, 100, 150, or 200 cm.

In some embodiments, initialization is used because the mobile device 202 is sometimes not at an optimal operating position when the application is started. For example, the camera in the mobile device could be pointing toward the user's feet instead of at a shelf to be scanned. In some embodiments, the operating distance is based on a size of a barcode (e.g., a barcode height and/or width) to be decoded, a line width of a barcode (e.g., for sufficient sharpness and/or pixel size to decode the barcode), and/or resolution of the camera. In some embodiments, a depth measurement and/or a focus distance of the mobile device 202 is used to determine if the mobile device is within the operating distance from objects to be analyzed.

Moving

In step 208, the system determines whether the mobile device 202 is moving. For example, data from non-optical sensors, such as accelerometers, is used to ascertain if the mobile device is moving faster than a predetermined threshold speed, a first threshold. In some embodiments, optical sensors are used. For example, motion blur from images acquired by a camera of the mobile device is used to ascertain if the mobile device is moving faster than the predetermined threshold speed.

While the mobile device is moving beyond the threshold speed, line 210, images from the camera are not being analyzed to detect and/or decode optical patterns. After the speed of the mobile device is below a second threshold (e.g., the same or different from the first threshold), or the mobile device is otherwise ascertained to be sufficiently stable for detecting and/or decoding barcodes, the workflow proceeds to scanning, step 212.

Scanning

In step 212, scanning, the system detects and/or decodes optical patterns. In some embodiments, the system waits until all the optical patterns within a preview of the mobile device are detected, decoded, and/or identified as not decodable before indicating to the user to continue. If the mobile device remains static, line 214, then the system detects and decodes optical patterns. However, if the mobile device is moved, line 215, then the process returns to the moving step 208 (e.g., and scanning is aborted; data about scanned optical patterns can be saved or discarded).

Presentation

After optical patterns are identified, decoded, and/or identified as not decodable (e.g., within a preview area of the camera of the mobile device), the workflow goes to step 216, presentation. In presentation, one or more overlays are presented on a screen of the mobile device to indicate optical patterns that have been decoded and/or optical patterns that have been detected and not decoded. For example, a green overlay (e.g., a dot or rectangle) is placed over a location of an optical pattern that is decoded, and a red overlay (e.g., a dot or rectangle) is placed over a location of an optical pattern that is not decoded. In some embodiments, optical patterns are also tracked, so that the optical patterns are not scanned again in subsequent images, and/or to instruct a user to move the mobile device to a new area to scan.

After presentation, the mobile device is moved, line 218, to a new location in preparation to scan more optical patterns (e.g., if all the codes are detected are/or decoded in one location). In some embodiments, a user-interface (UI) trigger 219 is used (e.g., a screen tap) before proceeding back to moving step 208.

Correction

If there is an optical pattern that is detected (e.g., either automatically or by the user) and not decoded, then the workflow 200 can proceed to step 220, correction. In some embodiments, the system waits for a UI trigger 222 before going to correction. For example, after presentation, a user could be prompted to select to proceed to scan more optical patterns (e.g., UI trigger 219; accept the error(s) and move on) or to select to correct, step 220, the decoding of the optical pattern that was previously not decoded. In some embodiments, if an optical pattern is not decoded, the system forces the user to correct or to accept that the optical pattern is not decoded before moving on.

For correction of scanning of an optical pattern, the user can be instructed to change position of the mobile device (e.g., to move closer, zoom in, and/or to translate the phone). For example, glare from a light reflecting on a label could prevent the optical pattern from being decoded. By repositioning the mobile device, the optical pattern can then be decoded. In some embodiments, a single-scanning barcode mode is implemented to decode the optical pattern that was not decoded. In some embodiments, the optical pattern is damaged and the user can manually enter data and/or accept that the optical pattern will not be decoded. In some embodiments, an aimer is presented to the user (e.g., crosshair, highlighting, and/or bounding box) on a screen of the mobile device for the user to aim at and/or zoom in/out on the barcode that was not decoded.

Re-Localization

In some embodiments, after a user attempts to correct an optical pattern that was not read, the system may have lost track of where the mobile device was in relation to the scene. Re-localization, step 224, can be performed in various ways. For example, the system can decode a unique barcode that was previously decoded to determine where the mobile device is in relation to the scene. In some embodiments, re-localization uses scene features and/or relative barcode position(s) within an image to ascertain the position of the mobile device in relation to the scene. In some embodiments a UI trigger 226 is used to start re-localization.

Example 1

Figure 3:
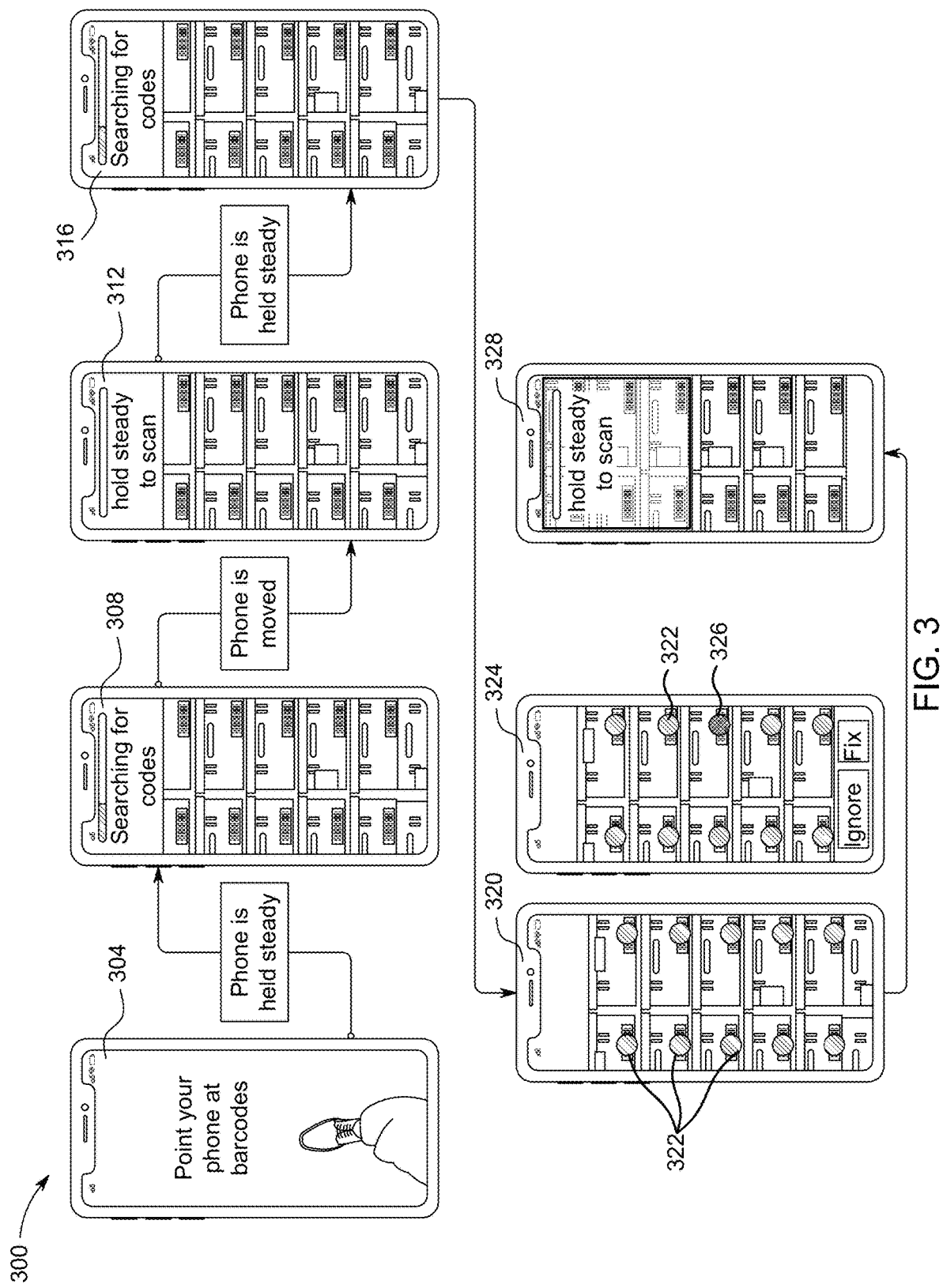
FIG. 3 depicts a first example the workflow for detecting multiple optical patterns in a scene.

FIG. 3 depicts a first example of implementing workflow 200 from FIG. 2. FIG. 3 depicts workflow 300 for detecting multiple optical patterns in a scene. Workflow 300 begins in step 304. In step 304, an application on a mobile device (e.g., the mobile device 202 in FIG. 2) is started and the user is instructed to point a camera of the mobile device toward optical patterns (e.g., barcodes). In step 308, the user points the camera toward a scene comprising optical patterns. The system ascertains that the mobile device is being held steady and begins to scan for optical patterns. The user is shown a progress bar for scanning for optical patterns. In step 312, the mobile device is moved before scanning in step 308 was completed. The user is instructed to hold the mobile device steady (e.g., the scanning step 308 is aborted). In step 316, scanning for optical patterns is performed while the mobile device is held steady.

In step 320, the user is presented results of the scan (e.g., green dots 322 overlaid on locations of decoded barcodes). Step 324 is an alternative to step 320. In step 324, one barcode is detected and not decoded (e.g., shown by a red dot 326). The user can take corrective action to try to decode the barcode that was not decoded.

In step 328, an area of decoded barcodes is indicated by a green box, and the user is instructed to hold the mobile device steady while a new portion of the scene is scanned. After a new area of the scene is scanned, the green box is expanded to show the area that has been scanned.

In some embodiments, scanning is performed over a certain number of images or a certain amount of time. Enough time is spent on scanning for optical patterns (e.g., detecting and decoding) that there is a high certainty (e.g., probability equal to or greater than 90, 95, 98, or 99 percent) that all the optical patterns in the preview are detected and decoded (or cannot be decoded). The presentation step indicates correctly decoded and/or missed optical patterns (e.g., step 320 or step 324). In some embodiments, optical patterns are depicted as decoded in real time (e.g., a green dot shows up on a barcode once the barcode is decoded). In some embodiments, presentation shows all decoded or missed optical patterns at the same time in a preview area (e.g., at the end of the scanning phase), instead of showing barcodes decoded all at one time.

Example 2

Figure 4:
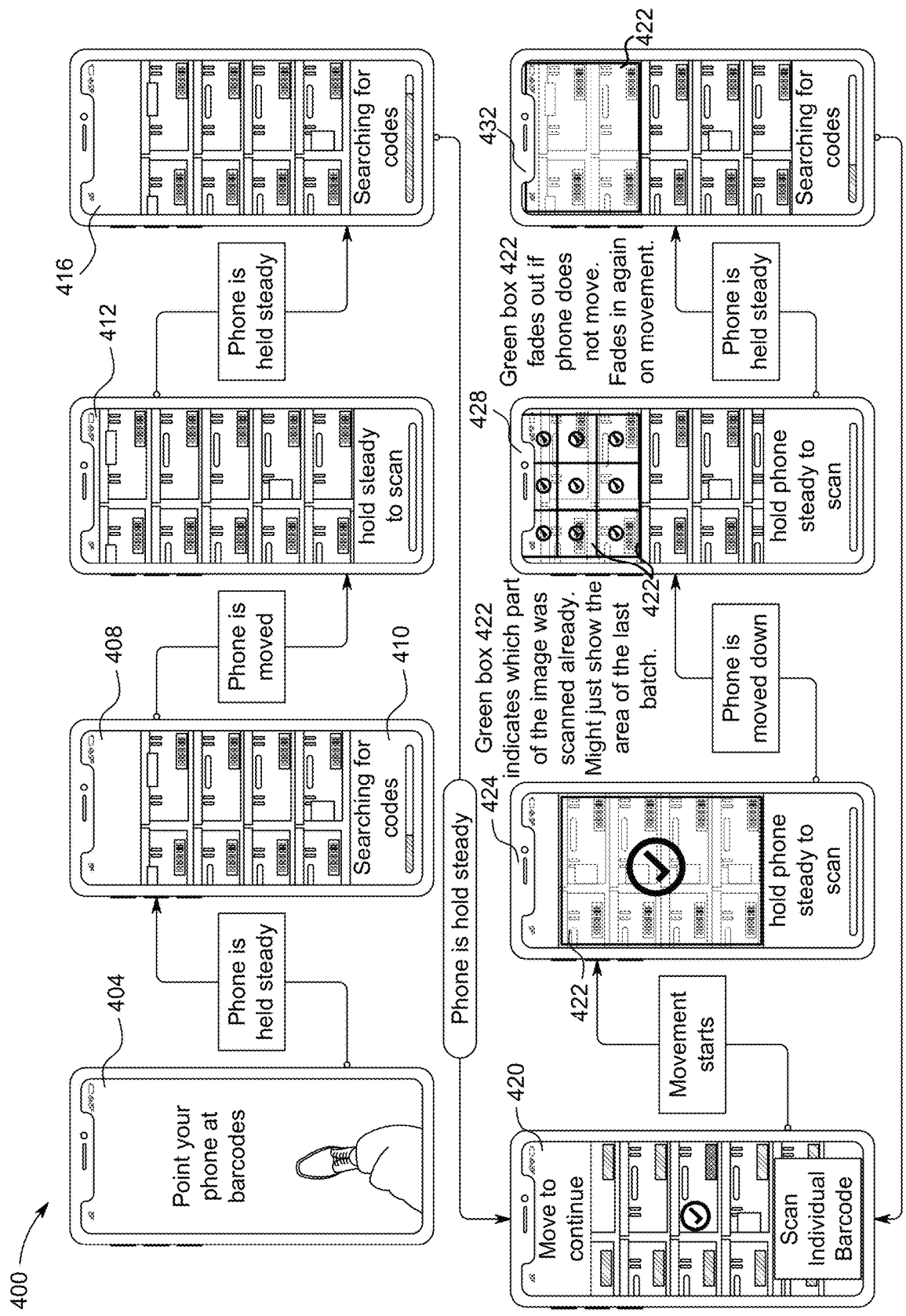
FIG. 4 depicts a second example the workflow for detecting multiple optical patterns in a scene.

FIG. 4 depicts a second example of implementing workflow 200 from FIG. 2 for detecting multiple optical patterns in a scene. Process 400 begins in step 404. In step 404, an application on a mobile device is started and the user is instructed to point a camera of the mobile device toward optical patterns. In step 408, the user points the camera toward a scene comprising optical patterns. The system ascertains that the mobile device is being held steady and begins to scan for optical patterns. The user is shown a progress bar 410 for scanning for optical patterns. In step 412, the mobile device is moved before scanning was completed in step 408, and the user is instructed to hold the mobile device steady. In step 416, scanning for optical patterns is performed while the mobile device is held steady.

Visualization in Scanned Areas

In step 420, the user is presented with the results of the scan (e.g., green rectangles overlaid on locations of decoded barcodes). After the user moves the mobile device, a green box 422 is placed over an area indicating that barcodes in that area have been scanned, step 424. The green box 422 continues to grow as the mobile device scans more areas. In some embodiments, a different shape than a box is used. Applicant has found that some users might lose time if only green dots or rectangles are shown on each individual optical pattern that is decoded (e.g., users may go back to areas previously scanned to review an area to ensure a barcode was not missed). The green box, dots, and/or rectangles are augmented-reality graphics presented on the display as an overlay of the scene to indicate to the user scanning progress. Positions of codes can be tracked, even when the codes are outside of the preview of the camera (e.g., by using visual odometry).

Step 428 shows a grid to confirm to a user a scanned area. In some embodiments, a grid is used as an intuitive way to indicate to a user the previously scanned areas (e.g., instead of the green box, or polygon, taking on an unusual shape, which could be confusing to some users). In some embodiments, areas of the scene that are scanned are lightened or darkened.

Step 432 shows the green box/area fades out if the phone does not move and fades in again on movement. In some embodiments, if scanned optical patterns presented go out of view, it is assumed the intention is to continue to scan (though positions of codes can be tracked even though the codes are out of the field of view of the camera). In some embodiments, a quadrant or line is used to distinguish a scanned area from an unscanned area.

Figure 5:
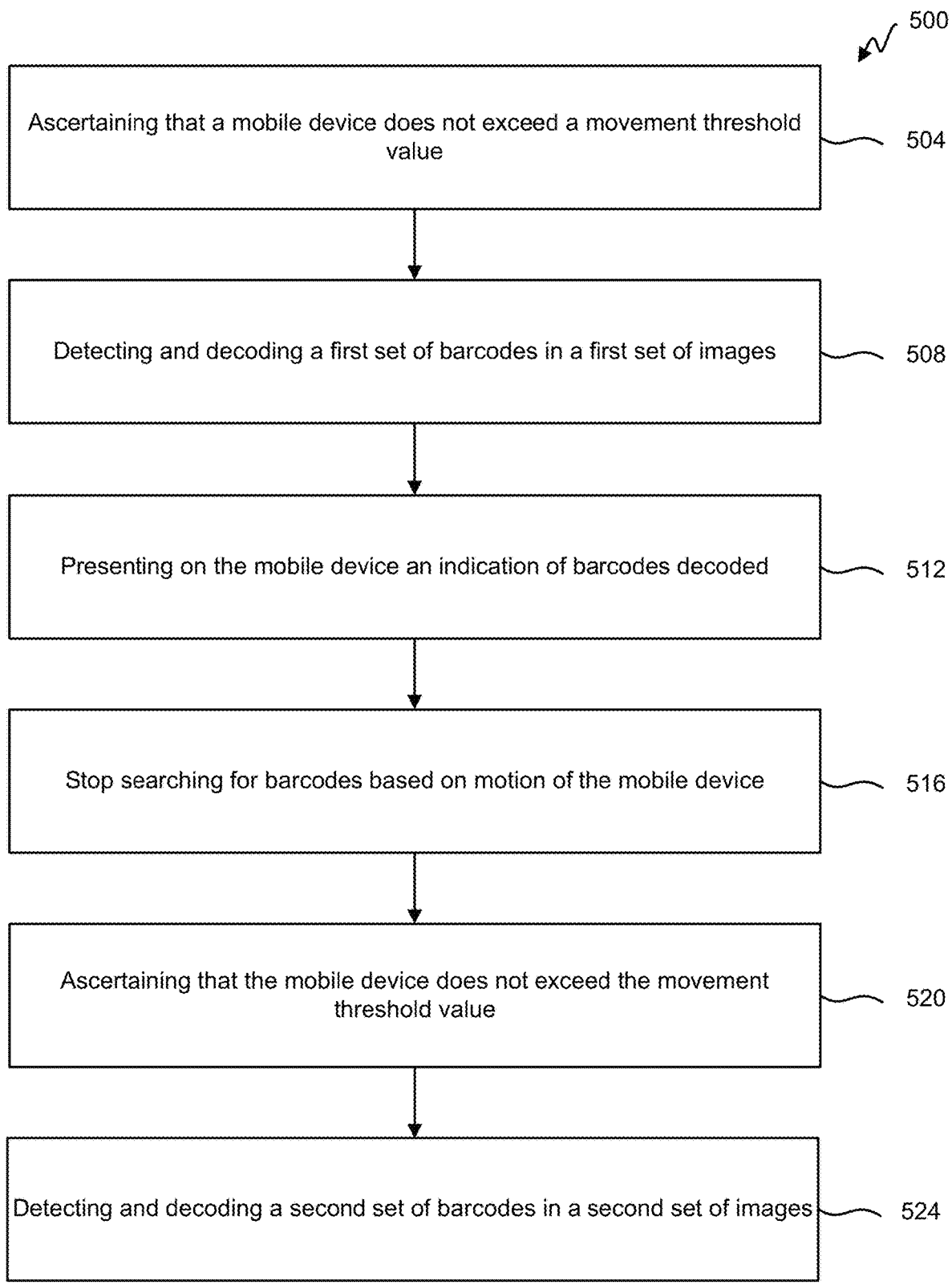
FIG. 5 illustrates a flowchart of an embodiment of a process for a workflow of detecting multiple optical patterns in a scene.

FIG. 5 illustrates a flowchart of an embodiment of a process 500 for a workflow for detecting multiple optical patterns in a scene. Process 500 begins in step 504 with ascertaining that a mobile device does not exceed a movement threshold value. Detecting motion of the mobile device can be performed using non-optical (e.g., accelerometers, inertial measurement units) and/or optical sensors (e.g., image analysis to detect motion blur).

In step 508, a first set of barcodes in a first set of images are detected and decoded. The first set of images are acquired using a camera of the mobile device. The first set of images are scanned to detect and decode the first set of barcodes. For example, an algorithm for detecting and/or decoding barcodes is run on the first set of images. In some embodiments, the algorithm for detecting and/or decoding barcodes also tracks barcodes within the preview of the camera.

In step 512, an indication of barcodes decoded is presented on the mobile device. The indication can be an augmented reality overlay, based on tracking the first set of barcodes within a preview of the camera. As mentioned in the description of FIGS. 3 and 4, indication can individually indicate barcodes that are successfully decoded and/or indication can indicate areas that have completed barcode scanning.

In step 516, scanning for barcodes is stopped, based on motion of the mobile device. For example, motion of the mobile device could exceed a threshold for motion for performing barcode scanning.

In step 520, motion of the mobile device is ascertained to not exceed the movement threshold value, after scanning for barcodes is stopped in step 516.

In step 524, a second set of barcodes is detected and decoded in a second set of images. The second set of images are acquired using the camera of the mobile device. The second set of barcodes can be tracked, and/or an indication of the second set of barcodes decoded can be presented to the user. For example, an area of successful barcode decoding can extend from the first set of barcodes to the second set of barcodes.

B. Mapping of Barcodes Using Visual Odometry

A homographic transform, sometimes referred to as a homography, defines a transformation between two views of a scene. The homographic transform between two images can be calculated from a set of feature correspondences (e.g., positions of point observations in a camera image space) between the views. Visual cues can be detected and tracked (e.g., optical flow) over multiple frames to establish pointwise correspondences between the views and then solve for the homographic transformation.

Figure 6:
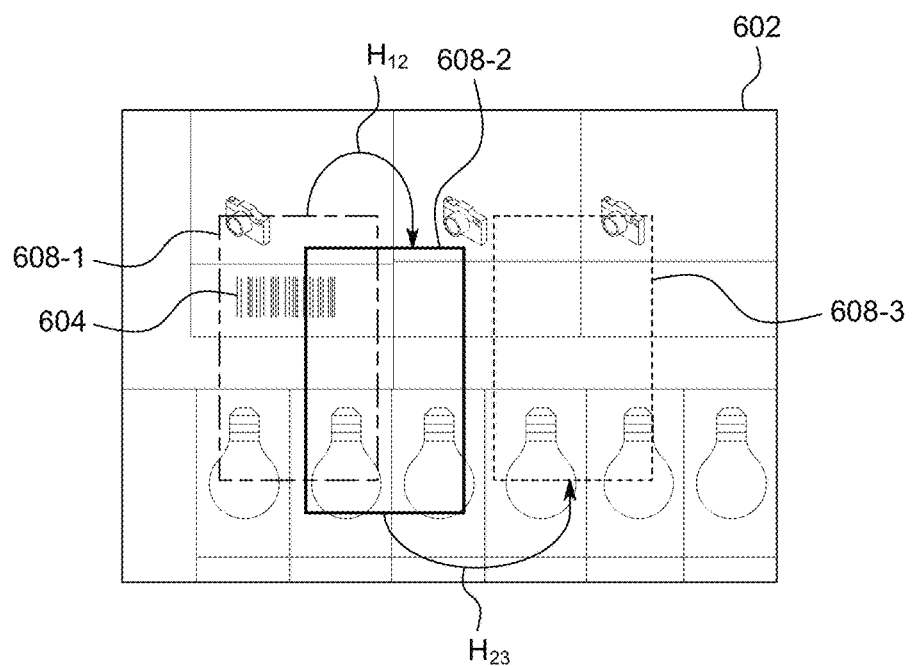
FIG. 6 illustrates a mobile device position in an embodiment of using visual odometry during optical pattern scanning.

FIG. 6 illustrates positions of a mobile device in relation to a scene 602 in an embodiment of using visual odometry during optical pattern scanning. FIG. 6 depicts the scene 602, an optical pattern 604 (e.g., a barcode) within the scene 602, a first frame 608-1 of the scene acquired by a camera of a mobile device at a first position; a second frame 608-2 of the scene acquired by the camera of the mobile device at a second position; and a third frame 608-3 of the scene acquired by the camera of the mobile device at a third position. A first homograpy $H_{12}$ is a transformation from the first frame 608-1 to the second frame 608-2. A second homography $H_{23}$ is a transformation from the second frame 608-2 to the third frame 608-3. In some embodiments, intermediate transformations (e.g., intermediate homographies with overlapping features) are used in frames between the second frame 608-2 and the third frame 608-3 to calculate the second homography $H_{23}$.

Figure 7:
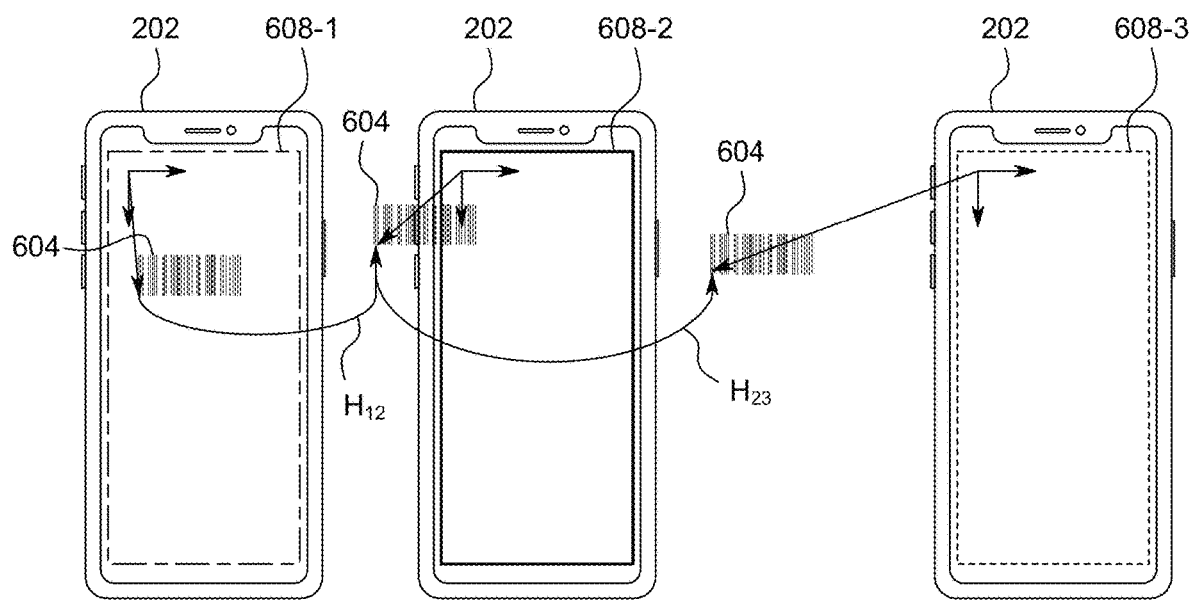
FIG. 7 illustrates an optical pattern in relation to a mobile device using visual odometry during optical pattern scanning.

FIG. 7 illustrates the optical pattern 604 in relation to a frame 608 of a mobile device 202, while using visual odometry during optical pattern scanning. The mobile device 202 comprises a camera used to acquire frames 608 (e.g., images). The mobile device 202 is a hand-held, mobile device (e.g., a smartphone or a tablet). In some embodiments, processing is performed on the mobile device 202 and/or using a remote device (e.g., on a remote server by transmitting image data from frames 608 to the remote server).

FIG. 6 and FIG. 7 depict tracking an object (e.g., optical pattern 604) in a quasi-planar scene. Inter-frame homographies H are used to predict the position of the object (e.g., a scanned optical pattern) in relation to a coordinate system of the frame 608. Similar principles can be used to visualize other augmentations (e.g., to highlight a part of the scene that has already been analyzed). A position of a point in subsequent views is derived by applying inter-frame transformations (e.g., homographies).

Three-dimensional tracking can be computationally intense (e.g., calculating three-dimensional homorgraphies can be computationally intense). To reduce computation (e.g., so that calculations can be made more efficiently and/or quickly on a mobile device), one or more assumptions are used to simplify tracking calculations, in some embodiments. One assumption is that the scene is almost planar, or that the optical patterns in the scene are almost planar. Another assumption is that movement of the mobile device is almost parallel to the scene, which can reduce parallax effects in images of the scene. Tracking can enable marking an optical pattern as scanned, even though the preview of the mobile device leaves the optical pattern and then returns later to the optical pattern.

In some configurations, pixel tracking and/or frame-to-frame camera transformations are used. For example, in two adjacent frames (e.g., from the first frame 608-1 to the second frame 608-2), a transformation (e.g., $H_{12}$) is calculated, image features are detected in frames (e.g., for optical flow) to map features, and/or image points are tracked from one frame to another. In some embodiments, intrinsics of the camera (e.g., lens focal length, lens geometric distortion, pixel size of the sensor) are not used (e.g., because triangulation is not used). In some configurations, real-world scale is not used; points are kept track of in pixel coordinates of a preview of the camera.

In FIGS. 6 and 7, the second frame 608-2 is moved down and to the right compared to the first frame 608.1. Thus, the position of the optical pattern 604 relative to the camera is moved up and to the left by a corresponding number of pixels. The system can track features outside of the preview (e.g., outside of the frame 608) using expanded pixel and/or negative pixel coordinates. For example, the optical pattern 604 can still be referenced in pixels from the third frame 608-3, even though the optical pattern 604 is not within the preview of the third frame 608-3. Thus features (e.g., optical patterns and/or locations for AR graphics) outside of the preview frame 608 can be efficiently tracked. Calculating inter-frame homographies can be considered visual odometry, e.g., the process of determining the camera pose (in our case not with 6 degrees of freedom) by analyzing a sequence of images. In some embodiments, images are segmented to obtain a planar surface having optical patterns. In some embodiments, two or more optical patterns 604 are tracked between frames 608.

In some situations, a user does not backtrack significantly while scanning optical patterns, so drift is not a high concern. In some situations, it can be helpful to re-localize the map (e.g., to correct for drift). For example, re-localization could be used after a user corrects a missed scan or has a large shift in orientation (e.g., the user points the camera of the mobile device 202 toward the ground while entering text). Key frames can be used for orientation of the camera with the scene (e.g., re-localization). A key frame is a view that was classified as being visually distinct. In some embodiments, a key frame includes an image of one, two, or more unique barcodes.

Figure 8:
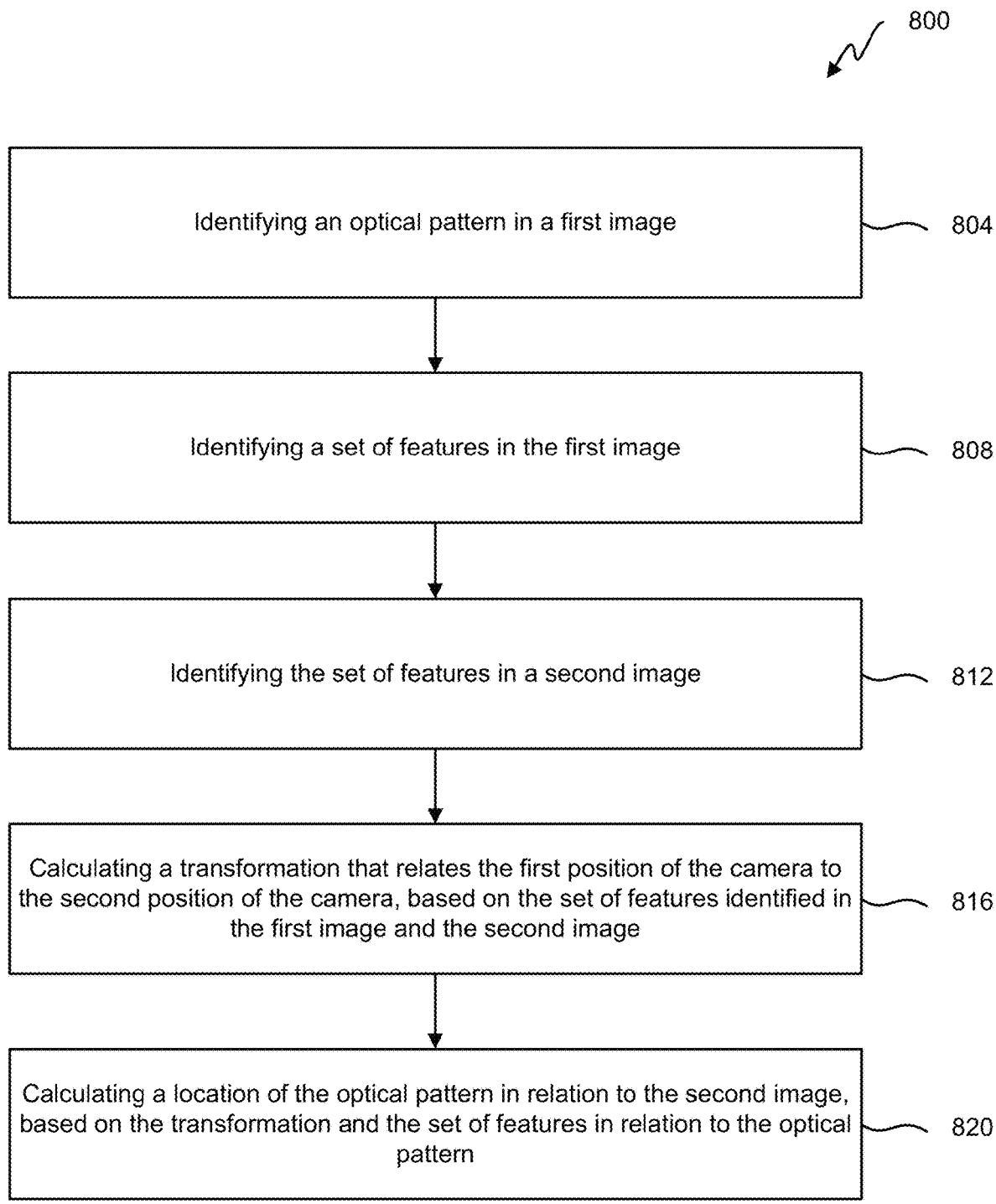
FIG. 8 illustrates a flowchart of an embodiment of a process for using visual odometry during optical pattern scanning.

FIG. 8 illustrates a flowchart of an embodiment of a process 800 for using visual odometry during optical pattern scanning. Process 800 begins in step 804 with identifying an optical pattern in a first image. A first image of a scene is acquired by a camera. The first image is acquired by the camera while the camera is at a first position. For example, the first frame 608-1 is acquired of the scene 602 in FIG. 6. The optical pattern (e.g., optical pattern 604 in FIG. 6) is identified in the first image. In some embodiments, the optical pattern is identified and decoded using the first image. The first image is received by a mobile device (e.g., a mobile device comprising the camera) and/or a device remote from the mobile device. A set of features in the first image are identified in relation to the optical pattern, step 808.

In step 812, the set of features is identified in a second image of the scene. The second image is acquired by the camera, while the camera is at a second position. For example, the second frame 608-2 is acquired of the scene 602 in FIG. 6. The second image is received by the mobile device and/or the device remote from the mobile device.

In step 816, a transformation is calculated that relates the first position of the camera to the second position of the camera, based on the set of features identified in the first image and the second image. For example, homography $H_{12}$ in FIG. 6 is calculated relating the position of the second frame 608-2 to the position of the first frame 608-1.

In step 820, a location of the optical pattern is calculated in relation to the second image, based on the transformation and the set of features in relation to the optical pattern. For example, a position of the optical pattern 604 is calculated in relation to the second frame 608-2, as shown in FIG. 7. In another example, the position of the optical pattern 604 is calculated in relation to the third frame 608-3, as shown in FIG. 7 (e.g., based on overlap of a second set of features in the third frame 608-3 and a previous frame, in addition to knowing the relation of the optical pattern to the previous frame).

In some embodiments, calculating the transformation assumes that the camera moves in a plane parallel with the scene. For example, the mobile device 202 moves in a plane parallel to the scene 602 and FIG. 6. In some embodiments, there is no or little relative tilt (e.g., equal or less than 2, 5, 10, 15, 20, 25, or 30 degrees of tilt) of the camera between frames 608, and/or the calculating the transformation assumes there is no tilt.

A location of the optical pattern in relation to the second image can be measured in pixels of the camera and/or the transformation is calculated without using intrinsic data about the camera. For example, calculations are made with respect to the camera sensor, or image, instead of to a real-world frame or scale of the scene 602. The optical pattern 604 is not fully within the second frame 608-2 of FIG. 7, and the position of the optical pattern 604 is still calculated with respect to the second frame 608-2 (e.g., even though the optical pattern cannot be identified and/or decoded in the second frame 608-2, the position of the optical pattern 604 is calculated with respect to the second frame 608-2). And even though no portion of the optical pattern 604 in FIG. 7 is within the third frame 608-3, the position of the optical pattern 604 can be calculated with respect to the third frame 608-3.

In some embodiments, features withing the set of features are estimated to be on a plane for calculating the transformation. In some embodiments, the process further comprises segmenting the second image into foreground and background segments, before identifying the set of features in the second image, and/or identifying the set of features in the foreground segment of the second image. For example, commonly owned U.S. patent application Ser. No. 17/385,604, filed on Jul. 26, 2021, which is incorporated by reference for all purposes, describes a technique for segmenting an image with barcodes.

In some embodiments, the set of features is a first set of features, the transformation is a first transformation, and/or the process further comprises: receiving a third image acquired by the camera, wherein the third image is acquired by the camera while the camera is at a third position; calculating a second transformation that relates the second position of the camera to the third position of the camera, based on a second set of features identified in both the second image and the third image; and calculating a location of the optical pattern in relation to the third image, based on the second transformation. For example, the optical pattern 604 is calculated in relation to the third frame 608-3 in FIG. 7 based on the homography $H_{23}$.

C. Automatic Detection of Missing Optical Patterns

Missing optical patterns can be automatically detected using tracking and/or visual odometry.

Figure 9:
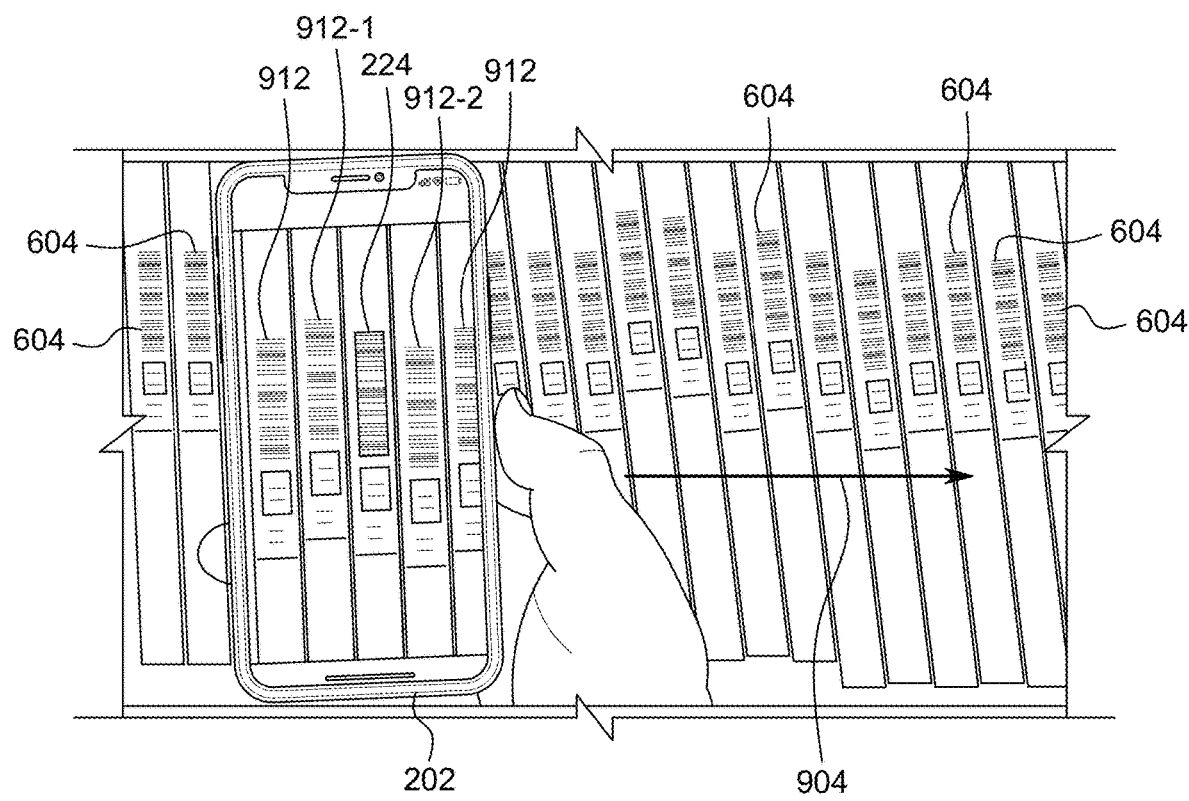
FIG. 9 illustrates an embodiment of swipe scanning.

FIG. 9 illustrates an embodiment of swipe scanning. As shown in FIG. 9, a mobile device 202 is used to detect and decode a plurality of optical patterns 604 in a line. The optical patterns 604 are attached to a plurality of blinders. The mobile device 202 is moved in one direction 904. Swipe scanning can use optical pattern tracking and/or visual odometry. An example of optical pattern tracking is given in U.S. Pat. No. 10,963,658, granted on Mar. 30, 2021, which is incorporated by reference for all purposes.

By limiting motion to one direction, calculations can be further simplified. In the embodiment shown in FIG. 9, transformation calculations assume the camera moves in one dimension only.

The optical patterns 604 are arranged in a periodic order. For example, each binder has about the same width. The periodic nature of the barcodes can be used to detect if a barcode is missing. For example, the system can predict the barcode 908 is missing and/or unreadable based on detecting positions of barcodes 912 and ascertaining that there is a gap between a first barcode 912-1 and a second barcode 912-2 that is larger than distances between other barcodes.

Figure 10:
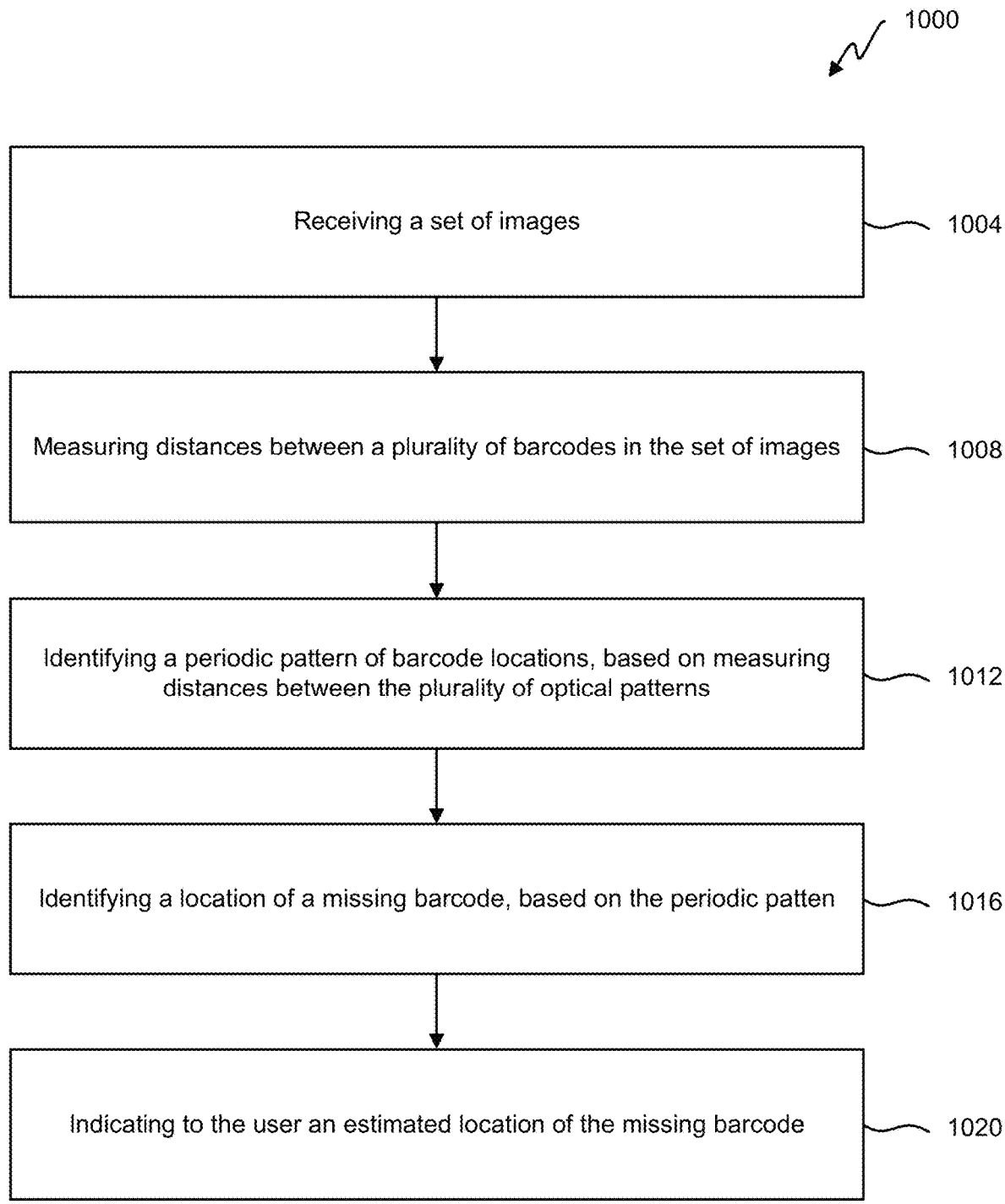
FIG. 10 illustrates a flowchart of an embodiment of a process for automatic detection of a missing barcode.

FIG. 10 illustrates a flowchart of an embodiment of a process 1000 for automatic detection of a missing optical pattern. Process 1000 begins in step 1004 with receiving a set of images. The set of images are acquired while the camara is held at one position or multiple positions. The first set images comprise a plurality of barcodes (or other optical patterns). In some embodiments, the set of images is one image or more than one image.

In step 1008, distances between the plurality barcodes are measured. A periodic pattern of barcode locations is identified, based on measuring distances between the plurality of barcodes, step 1012. A location of a missing barcode is identified, based on the periodic pattern, step 1016. An indication of the location of the missing barcode is presented to the user. For example, the indication of the location of the missing barcode is an augmented-reality overlay on the screen of the mobile device. In some embodiments, distances are relative distances (e.g., pixels) and/or optical patterns are assumed to be on a plane. In some embodiments, a map of the locations of the plurality of barcodes is generated, and/or distances between barcodes are measured using the map. In some embodiments, the periodic structure is two dimensional (e.g., as shown in FIG. 11).

D. Counting Non-Serialized Barcodes

In some embodiments, non-serialized barcodes (or other optical patterns) can be challenging to count. For example, if barcodes are counted based on decoding a barcode, then multiple non-serialized barcodes can be counted as one barcode. To count non-serialized barcodes, barcodes are mapped using tracking (e.g., within a preview of a camera) and/or using visual odometry (e.g., to track barcodes outside the preview area of the camera).

Figure 11:
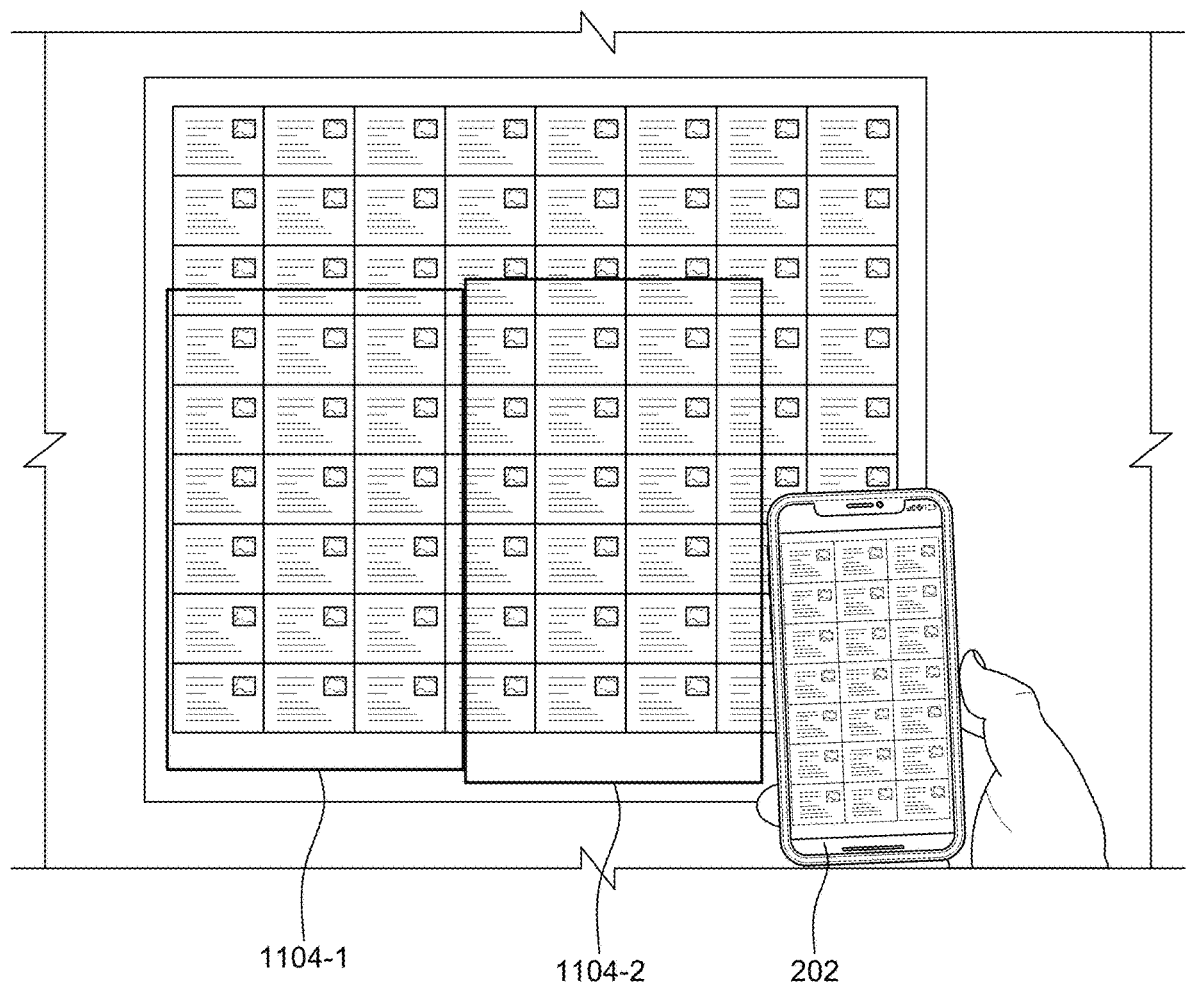
FIG. 11 illustrates an embodiment of batch scanning.

FIG. 11 illustrates an embodiment of batch scanning and counting non-serialized barcodes. FIG. 11 depicts a first batch 1104-1 and a second batch 1104-2 of scanned barcodes, scanned by a mobile device 202.

Figure 12:
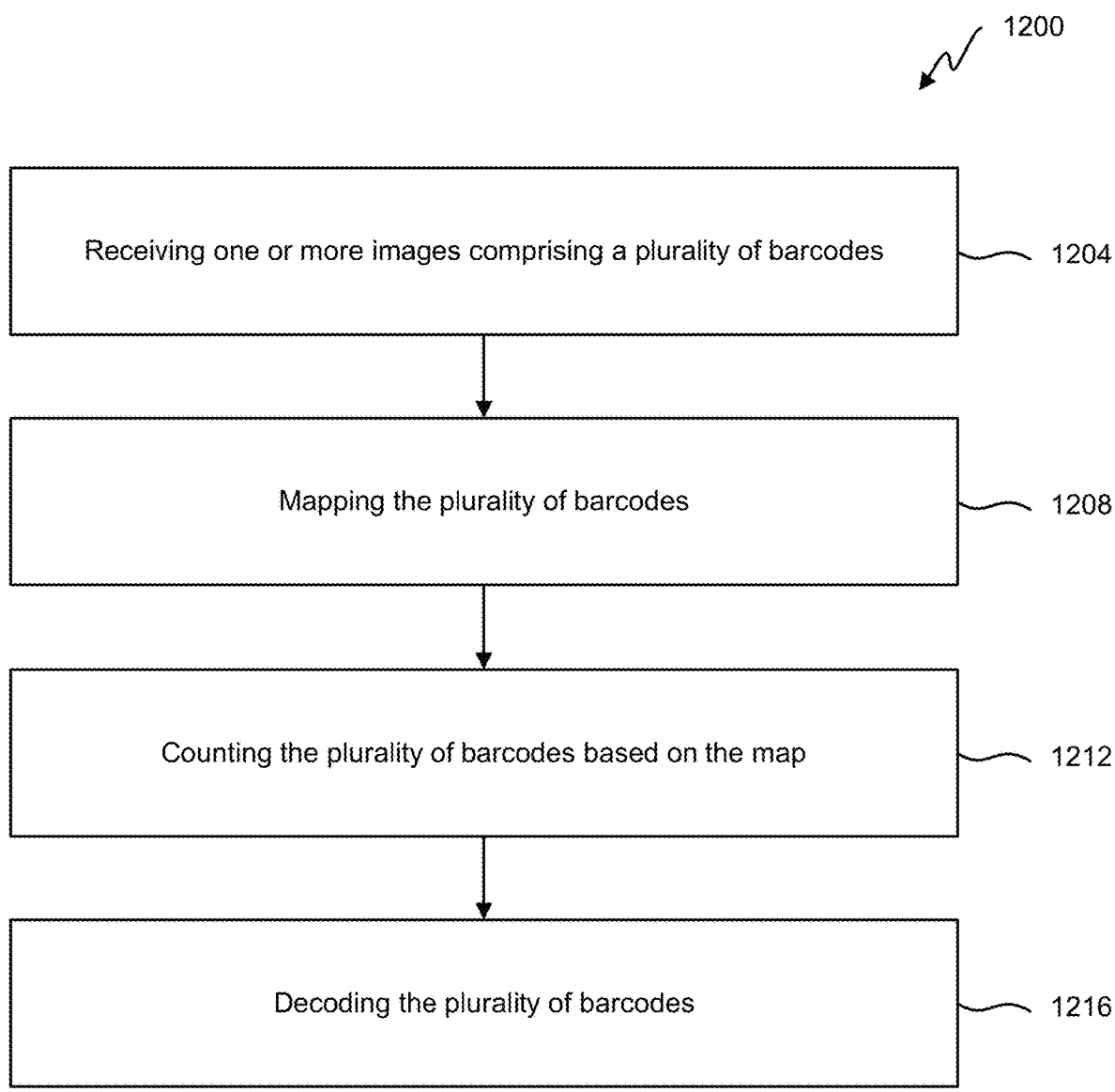
FIG. 12 illustrates a flowchart of an embodiment of a process for counting non-serialized optical patterns.

FIG. 12 illustrates a flowchart of an embodiment of a process 1200 for counting non-serialized optical patterns. Process 1200 begins in step 1204 with receiving one or more images comprising a plurality of barcodes. At least two of the plurality of barcodes are non-serialized, such that the at least two barcodes are non-distinguishable from each other, based on optical analysis of the barcodes. In step 1208, the plurality of barcodes are mapped. For example, the plurality of barcodes can be mapped using barcode tracking and/or visual odometry. In step 1212, the plurality of barcodes are counted using the map. In step 1216, the plurality of barcodes are decoded. In some embodiments, the map comprises nodes (e.g., locations of barcodes) and lines connecting the nodes, where the lines each represent a distance between nodes (e.g., wherein the lines are measured in number of pixels).

An indication to the user can be presented on a barcode, or the plurality of barcodes, that have been counted and/or decoded. In some embodiments, barcodes arranged in a periodic, or known, fashion can be used to identify a missing barcode. In some embodiments, each of the plurality of barcodes is not decoded (e.g., just counted).

Multiple Focal Distances

To increase a number of barcodes detected, multiple focal distances of the camera can be used. For example, multiple images are acquired of each batch 1104 in FIG. 11, and the multiple images are acquired using a different focal setting of the camera. Thus each batch is imaged multiple times.

In certain scenarios, barcodes that are farther from the camera are not decoded, due to the camera being focused on an orthogonal plane that is usually on the closest barcodes. To detect and/or decode more barcodes, the focal length of the camera can be changed on the fly to increase the number of barcodes scanned. For example, images of a scene can be captured using [f−D, f, f+D] in a case of three different focal lengths, wherein f is one focal length and D is a fixed interval.

In some embodiments, an adaptive focal distance is used (e.g., instead of the fixed interval D). For an adaptive focal distance, a parameter other than a fixed interval is used. For example, areas of high contrast in an image could be identified, and focal distances to bring the areas of high contrast into focus could be used to try to detect and/or decode more barcodes within a batch.

In some embodiments, a process further comprises receiving a plurality of images acquired by the camera, wherein the camera acquires the plurality of images while the camera is at a first position. Each of the plurality of images is acquired using a different focal distance setting of the camera. A second optical pattern is detected and/or decoded in one of the plurality of images. A location of the second optical pattern is calculated in relation to the second image, based on a transformation.

Drift Correction

While calculating camera pose (e.g., absolute pose in relation to an origin) as a cumulative transformation between adjacent frames, small errors can sum up and result in a visual offset between the physical world and the projected overlays (e.g., also known as drift).

In some embodiments, to reduce drift, camera pose (the camera pose relative to a coordinate frame where an AR overlay was initialized) is established as a sum of transformations between keyframes (e.g., instead of a sum of transformations between each frame of a video stream).

A keyframe is a single frame from a video stream that was identified or selected by the application because the frame is visually particularly discriminant. For example, a keyframe can be captured during scanning (e.g., step 112 in FIG. 1 while barcodes are scanned); during presentation (e.g., step 116 in FIG. 1); and/or when a significant change is detected in the view (e.g., in terms of motion or in terms of change in a higher order description of the scene, such as sparse feature points or a dense correlation measures). In some embodiments, a keyframe is defined by feature descriptors (e.g., points of interest) that can be visually identified.

During runtime, the application builds a graph where nodes relate to the keyframes and edges relate to the relative transformation between keyframes. A weight/confidence value can be assigned to each edge (e.g., to a transformation between two keyframes) according to how strong the correlation between two keyframes is. A "best" cumulative transform from an origin frame to the current frame is then established (e.g., continuously) as a path between keyframes that leads to a best overall score (which is a function of the edge weightings of the connection from the origin frame to the current frame).

The scoring between two keyframes may be calculated as a measure of a correlation between the feature descriptors of points of interest in both keyframes and/or by means of a neural network. For example, a score can be stablished based on a feature matching and/or by a neural embedding. In some configurations, learning-based approaches have shown to be more robust for such tasks since they are also able to reason about the underlying 3D scene during feature assignment.

Re-localization. During a re-localization phase (e.g., step 124 in FIG. 1), the camera pose (e.g., absolute camera pose based on a transformation relative to the origin frame) can be re-established through detection markers that are unique to the scene (e.g. barcodes) and/or by means of a keyframe graph described above. The edges of the keyframe graph can be re-weighted according to the position of the camera where tracking was lost. A combination of both approaches is also possible.

Scene change detection. If the user moves on to a different setup and tracking is lost, the application can automatically fall back into a re-localization mode where the observed scene is correlated to the keyframe graph. If no correlation is found, a new graph is initialized. Inertial measurement unit (IMU) measurements may be used in addition to visual cues of a scene change. The old graph can still persist and may serve for visual reconstructions of a scanned scene (e.g. a panoramic view where the locations of scanned locations, or locations where barcodes were suspected that couldn't be decoded, are indicated).

Figure 13A:
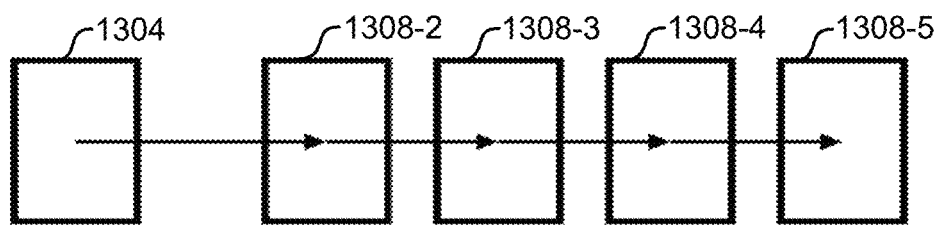
FIG. 13a depicts an embodiment of accumulative transformation calculation.

FIG. 13a depicts an embodiment of accumulative transformation calculation. Transformation calculation begins with acquiring an origin frame 1304. Transformations are calculated based on the origin frame 1304, a second frame 1308-2, a third frame 1308-3, a fourth frame 1308-4, a fifth frame 1308-5, and so on. For example, frames 1308 are sequential frames of a video feed for a camera preview on a mobile device.

Figure 13B:
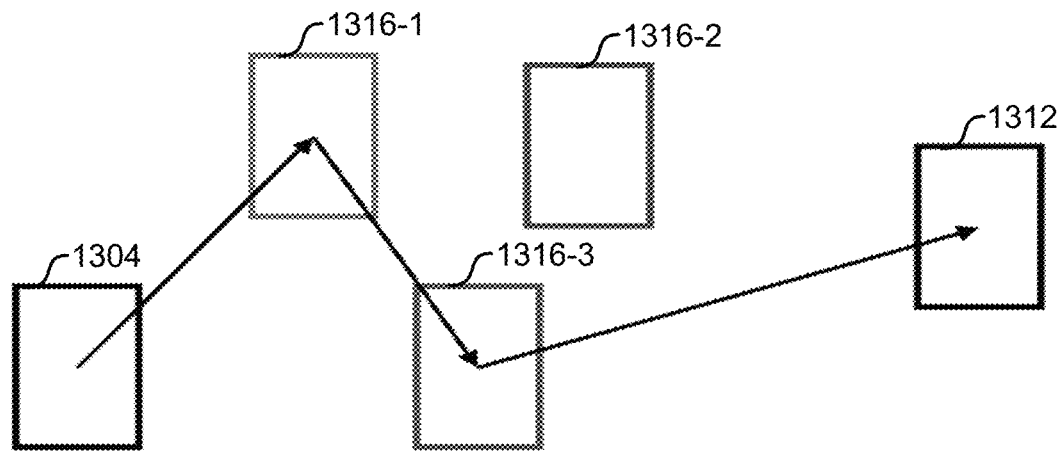
FIG. 13b depicts an embodiment of keyframe-based transformation.

FIG. 13b depicts an embodiment of keyframe-based transformation. FIG. 13b shows an origin frame 1304, a current frame 1312, a first keyframe 1316-1, a second keyframe 1316-2, and a third keyframe 1316-3. The third keyframe 1316-3 is acquired after the second keyframe 1316-2, and the second keyframe 1316-2 is acquired after the first keyframe 1316-1. Calculation of the transformation of the current frame 1312 is based on a transformation from the origin frame 1304 to the first keyframe 1316-1, from the first keyframe 1316-1 to the third keyframe 1316-3, and from the third keyframe 1316-3 to the current frame 1312, and not through the second keyframe 1316-2. For example, the path through the third keyframe 1316-3 and not through the second keyframe 1316-2 could have a higher overall score, as discussed above.

In some embodiments, keyframes 1316 are non-consecutive images from a video feed. For example, keyframes 1316 are selected from a video feed equal to or less than one keyframe 1316 per 0.3, 0.5, 1, 1.5, or 2 seconds and/or equal to or greater than one keyframe 1316 per 1, 2, 5, or 10 seconds. Considering that a video feed can acquire image frames at 30 frames per second, or faster, keyframes 1316 are selected at a slower rate than images of the video are acquired.

Figure 14:
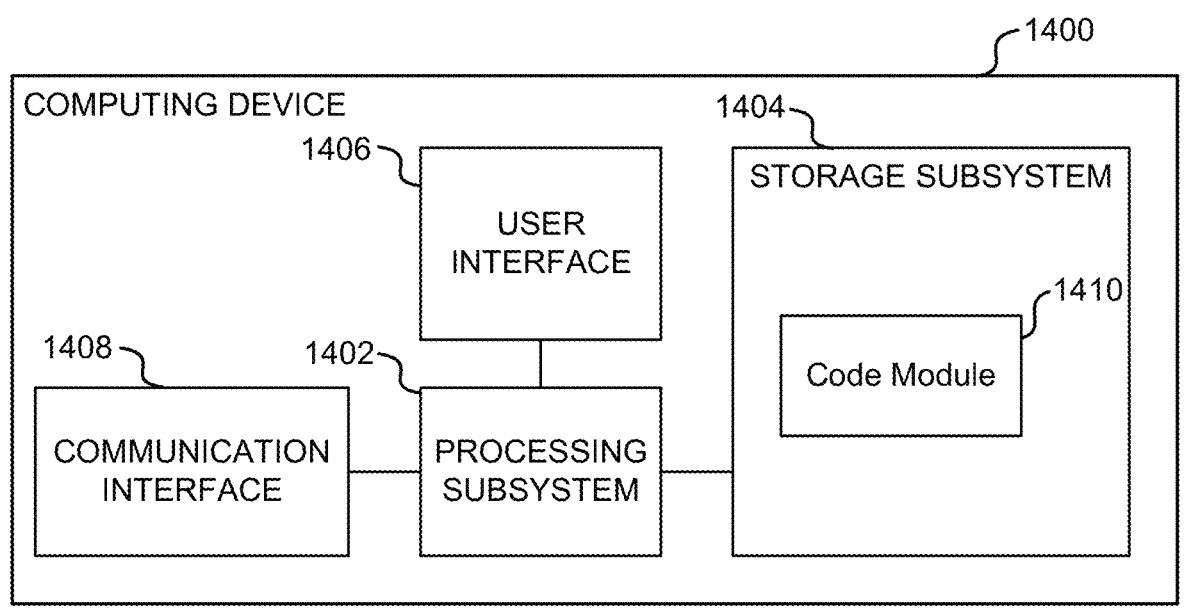
FIG. 14 depicts a block diagram of an embodiment of a computer system.

FIG. 14 is a simplified block diagram of a computing device 1400. Computing device 1400 can implement some or all functions, behaviors, and/or capabilities described above that would use electronic storage or processing, as well as other functions, behaviors, or capabilities not expressly described. Computing device 1400 includes a processing subsystem 1402, a storage subsystem 1404, a user interface 1406, and/or a communication interface 1408. Computing device 1400 can also include other components (not explicitly shown) such as a battery, power controllers, and other components operable to provide various enhanced capabilities. In various embodiments, computing device 1400 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1404 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1404 can store one or more applications and/or operating system programs to be executed by processing subsystem 1402, including programs to implement some or all operations described above that would be performed using a computer. For example, storage subsystem 1404 can store one or more code modules 1410 for implementing one or more method steps described above.

A firmware and/or software implementation may be implemented with modules (e.g., procedures, functions, and so on). A machine-readable medium tangibly embodying instructions may be used in implementing methodologies described herein. Code modules 1410 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1410) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1410 may comprise sets of instructions (codes) embodied on a computer-readable medium that directs a processor of a computing device 1400 to perform corresponding actions. The instructions may be configured to run in sequential order, in parallel (such as under different processing threads), or in a combination thereof. After loading a code module 1410 on a general purpose computer system, the general purpose computer is transformed into a special purpose computer system.

Computer programs incorporating various features described herein (e.g., in one or more code modules 1410) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1404 can also store information useful for establishing network connections using the communication interface 1408.

User interface 1406 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1406 to invoke the functionality of computing device 1400 and can view and/or hear output from computing device 1400 via output devices of user interface 1406. For some embodiments, the user interface 1406 might not be present (e.g., for a process using an ASIC).

Processing subsystem 1402 can be implemented as one or more processors (e.g., integrated circuits, one or more single-core or multi-core microprocessors, microcontrollers, central processing unit, graphics processing unit, etc.). In operation, processing subsystem 1402 can control the operation of computing device 1400. In some embodiments, processing subsystem 1402 can execute a variety of programs in response to program code and can maintain multiple concurrently executing programs or processes. At a given time, some or all of a program code to be executed can reside in processing subsystem 1402 and/or in storage media, such as storage subsystem 1404. Through programming, processing subsystem 1402 can provide various functionality for computing device 1400. Processing subsystem 1402 can also execute other programs to control other functions of computing device 1400, including programs that may be stored in storage subsystem 1404.

Communication interface 1408 can provide voice and/or data communication capability for computing device 1400. In some embodiments, communication interface 1408 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1408 can provide wired connectivity (e.g., universal serial bus, Ethernet, universal asynchronous receiver/transmitter, etc.) in addition to, or in lieu of, a wireless interface. Communication interface 1408 can be implemented using a combination of hardware (e.g., driver circuits, antennas, modulators/demodulators, encoders/decoders, and other analog and/or digital signal processing circuits) and software components. In some embodiments, communication interface 1408 can support multiple communication channels concurrently. In some embodiments the communication interface 1408 is not used.

It will be appreciated that computing device 1400 is illustrative and that variations and modifications are possible. A computing device can have various functionality not specifically described (e.g., voice communication via cellular telephone networks) and can include components appropriate to such functionality.

Further, while the computing device 1400 is described with reference to particular blocks, it is to be understood that these blocks are defined for convenience of description and are not intended to imply a particular physical arrangement of component parts. For example, the processing subsystem 1402, the storage subsystem, the user interface 1406, and/or the communication interface 1408 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 1400.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for using visual odometry during optical pattern scanning, the system comprising:
    a camera; and
    one or more memory devices comprising instructions that, when executed, cause one or more processors to perform the following steps:
        receiving a first image of a scene acquired by the camera, wherein the first image is acquired by the camera while the camera is at a first position relative to the scene;
        identifying an optical pattern in the first image;
        identifying a set of features in the first image in relation to the optical pattern;
        receiving a second image of the scene acquired by the camera, wherein the second image is acquired by the camera while the camera is at a second position relative to the scene, wherein the second position is different from the first position;
        identifying the set of features in the second image;
        calculating a transformation that relates the first position of the camera to the second position of the camera, based on the set of features identified in the first image and the second image; and
        calculating a location of the optical pattern in relation to the second image, based on the transformation and the set of features in relation to the optical pattern.

2. The system of claim 1, wherein the camera is part of a hand-held, mobile device.

3. The system of claim 2, wherein the one or more memory devices are part of the hand-held, mobile device.

4. The system of claim 1, wherein calculating the transformation assumes that the camera moves in a plane parallel with the scene.

5. The system of claim 1, wherein the location of the optical pattern in relation to the second image is measured in pixels of the camera.

6. The system of claim 1, wherein the transformation is calculated without using intrinsic data about the camera.

7. A method for using visual odometry during optical pattern scanning, the method comprising:
    receiving a first image of a scene acquired by a camera, wherein the first image is acquired by the camera while the camera is at a first position relative to the scene;
    identifying an optical pattern in the first image;
    identifying a set of features in the first image in relation to the optical pattern;
    receiving a second image of the scene acquired by the camera, wherein the second image is acquired by the camera while the camera is at a second position relative to the scene, wherein the second position is different from the first position;
    identifying the set of features in the second image;
    calculating a transformation that relates the first position of the camera to the second position of the camera, based on the set of features identified in the first image and the second image; and
    calculating a location of the optical pattern in relation to the second image, based on the transformation and the set of features in relation to the optical pattern.

8. The method of claim 7, wherein calculating the transformation assumes the camera moves in only one dimension.

9. The method of claim 7, wherein the optical pattern is not fully in the second image.

10. The method of claim 7, wherein the set of features is estimated to be on a plane while calculating the transformation.

11. The method of claim 7, wherein calculating the transformation assumes that the camera moves in a plane parallel with the scene.

12. The method of claim 7, wherein the location of the optical pattern in relation to the second image is measured in pixels of the camera.

13. The method of claim 7, wherein:
    the set of features is a first set of features;
    the transformation is a first transformation; and
    the method further comprises:

receiving a third image acquired by the camera, wherein the third image is acquired by the camera while the camera is at a third position;

calculating a second transformation that relates the second position of the camera to the third position of the camera, based on a second set of features identified in both the second image and the third image; and calculating a location of the optical pattern in relation to the third image, based on the second transformation.

14. The method of claim 7, further comprising:

segmenting the second image into foreground and background segments, before identifying the set of features in the second image; and identifying the set of features in the foreground segment of the second image.

15. The method of claim 7, wherein the transformation assumes no tilt of the camera with respect to the scene.

16. The method of claim 7, wherein the optical pattern is a first optical pattern, and the method further comprises:

receiving a plurality of images acquired by the camera, wherein:

the camera acquires the plurality of images while the camera is at the first position; and each of the plurality of images is acquired using a different focal distance setting of the camera; and identifying a second optical pattern in one of the plurality of images; and calculating a location of the second optical pattern in relation to the second image, based on the transformation.

17. A memory device comprising instructions that, when executed, cause one or more processors to perform the following steps:

receiving a first image of a scene acquired by a camera, wherein the first image is acquired by the camera while the camera is at a first position relative to the scene;

identifying an optical pattern in the first image;

identifying a set of features in the first image in relation to the optical pattern;

receiving a second image of the scene acquired by the camera, wherein the second image is acquired by the camera while the camera is at a second position relative to the scene, wherein the second position is different from the first position;

identifying the set of features in the second image;

calculating a transformation that relates the first position of the camera to the second position of the camera, based on the set of features identified in the first image and the second image; and calculating a location of the optical pattern in relation to the second image, based on the transformation and the set of features in relation to the optical pattern.

18. The memory device of claim 17, wherein calculating the transformation assumes the camera moves in only one dimension.

19. The memory device of claim 17, wherein the instructions further cause the one or more processors to perform the following steps:

segmenting the second image into foreground and background segments, before identifying the set of features in the second image; and identifying the set of features in the foreground segment of the second image.

20. The memory device of claim 17, wherein the transformation assumes no tilt of the camera with respect to the scene.

* * * * *